3,332,967
3-HYDROXY-1,5-BIS-DEHYDRO STEROIDS AND
METHODS FOR THEIR MANUFACTURE
Eugene P. Oliveto, Glen Ridge, N.J., and Masato Tanabe,
Palo Alto, Calif., assignors to Schering Corporation,
Bloomfield, N.J., a corporation of New Jersey
No Drawing. Filed Mar. 7, 1963, Ser. No. 263,441
11 Claims. (Cl. 260—397.45)

This invention relates to a novel class of cyclopentano-phenanthrene compounds and to methods for their manufacture, including intermediates produced thereby.

More particularly, this invention relates to 1,5-bis-dehydro-steroids having a hydroxy group at C–3, including esters and derivatives thereof, which are therapeutically valuable per se and are also useful as intermediates in preparing other valuable compounds.

Illustrative of the novel 3-hydroxy-1,5-dienes and derivatives thereof of our invention are compounds such as those of the following structural formula:

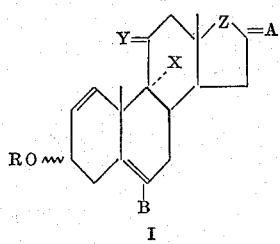

I wherein A is a member selected from the group consisting of hydrogen, (H,α-lower alkyl), (H,β-lower alkyl), (preferably methyl), lower alkylene (preferably methylene), (H,α-hydroxy), and (H,α-lower-alkanoyloxy); B is a member selected from the group consisting of hydrogen, lower alkyl (preferably methyl), and halogen (preferably fluorine); R is a member selected from the group consisting of hydrogen, lower alkyl, and acyl; Y is a member selected from the group consisting of hydrogen, keto (H,β-OR'), (H,α-OR'), and (H,β-halogen), R' being a member selected from the group consisting of hydrogen and lower alkanoyl; X is a member selected from the group consisting of hydrogen and halogen, and when Y is (H,α-OR'), X is hydrogen, and when Y is (H,β-halogen), X is halogen, and X and Y together are members selected from the group consisting of an epoxy and a double bond; and Z is a member selected from the group consisting of

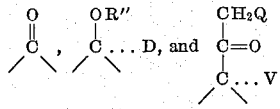

R" being a member selected from the group consisting of hydrogen and an acid radical of a carboxylic acid having up to 18 carbon atoms; D being a member selected from the group consisting of hydrogen, lower alkyl, ethinyl, halogeno-ethinyl, and alkyl-ethinyl; V being a member selected from the group consisting of hydrogen, hydroxy, and lower alkanoyloxy; and Q is a member of the group consisting of hydrogen, hydroxy, acyloxy, and halogen.

By "lower alkyl" is contemplated hydrocarbon radicals having up to four carbon atoms, thus including methyl, ethyl, n-propyl, iso-propyl, n-butyl, sec-butyl, and tert-butyl radicals.

Illustrative of the carboxylic acids contemplated at C–3 and C–17, and, in the case of pregnanes, at C–21, are lower alkanoates such as acetate, propionate, caproate, tertiarybutylacetate, cyclopentylpropionate, di-methylacetate, trimethylacetate, and phenoxyacetate; aryl esters such as benzoate, nicotinate, thiophene carboxylate; and esters from dibasic organic acids such as succinate, phthalate, and sulfobenzoate. Also included are the alkali metal salts of the dibasic carboxylic acid esters such as, for example, the 3-sodium hemisuccinate of 17α-methyl-1,5-androstadiene-3,17β-diol.

In addition to carboxylic acid esters such as described above, included among the acyl groups at C–3 and, in the case of pregnadienes, at C–21 of the 3-hydroxy-1,5-bis-dehydro steroids of our invention are inorganic acid esters such as sulfate and phosphate.

In the structural formula shown above, the bond at C–3 is designated by a wavy line ( $\sim$ ) to indicate that both the α and β isomeric forms at this position are encompassed by this invention. When a compound name does not specify a particular configuration (i.e., α or β) at C–3 or C–16, e.g., 16-methyl-1,5-pregnadiene-3,11β, 17α,21-tetrol-20-one, it is understood that both the a and β isomeric forms are included, e.g., 16α-methyl- and 16β-methyl - 1,5 - pregnadiene - 3β,11β,17α,21 - tetrol - 20-one and 16α-methyl- and 16β-methyl-1,5-pregnadiene-3α, 11β,17α,21-tetrol-20-one.

Among the therapeutically active, novel steroids of our invention are 3-hydroxy-1,5-androstadienes such as those defined by general Formula I wherein Z is

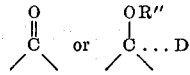

R" and D being defined as hereinabove (except those compounds wherein X and Y is an epoxy or a double bond, valuable mainly as intermediates), which are superior anabolic agents having a favorable anabolic/androgenic ratio, i.e., they are potent anabolic agents having a minimum of androgenic activity. Our 3-hydroxy-1,5-androstadienes may be advantageously used in place of anabolic/androgenic agents used in known pharmaceutical preparations with the advantage that lower doses of the 3-hydroxy-1,5-dienes may be used in view of their superior activity.

Typical 3-hydroxy-1,5-androstadienes of our invention valuable as anabolic agents are compounds such as 1,5-androstadiene-3β-ol-17-one,
1,5-androstadiene-3β,17β-diol,
17α-methyl-1,5-androstadiene-3β,17β-diol,
9α,11β-dichloro-17α-methyl-1,5-androstadiene-
   3β,17β-diol,
17α-ethinyl-1,5-androstadiene-3,17β-diol,
17α-chloroethinyl-1,5-androstadiene-3,17β-diol, the 3α-epimers of the foregoing and the 3-acetate esters thereof.

In addition, 17α-alkynyl derivatives defined by the general Formula I such as 17α-ethinyl-1,5-androstadiene-3, 17β - diol and 17α - halogenoethinyl - 1,5 - androstadiene-3,17β-diol possess progestational and anti-fertility properties.

The preferred species of our invention are the anabolic/androgenic agents, 17α - methyl - 1,5 - androstadiene-3β,17β-diol and 3-esters thereof (e.g., the 3-propionate, 3-decanoate, and the 3-enanthate thereof) which are orally effective and advantageously and surprisingly have been found to possess a greatly enhanced and favorable anabolic/androgenic activity ratio over that of the known-orally effective anabolic agent, 17α-methyl-1,4-androstadiene-17β-ol-3-one.

Our anabolic/androgenic agents are preferably administered orally in daily doses ranging from about 0.5 to 20 mg. depending on the nature and severity of the patient's illness. Convenient composition forms for oral use are tablets of unit doses of 0.5 mg. and 5 mg.

In general, the pharmaceutical formulations of our 3-hydroxy-1,5-androstadienes are prepared utilizing procedures known in the art. In formulating these pharmaceutical compositions, a novel compound of this invention, e.g., 17-α-methyl-1,5-androstadiene-3β,17β-diol, is usually compounded with an excipient which is edible and chemically inert to the aforenamed 1,5-androstadiene. Excipients such as lactose, sucrose, starch, pre-gelatinized starch, gum arabic, gum tragaccenth or mixtures thereof may be used, usually in admixture with an additive such as magnesium stearate, talc, cornstarch or the like.

Oral pharmaceutical composition forms other than tablets may be used. Thus, in general, fine powders or granules of 17α - methyl - 1,5 - androstadiene - 3β,17β-diol or an ester thereof may contain diluents and dispersing and surface active agents and may be presented in a syrup, or in capsules or cachets in the dry state or in a non-aqueous suspension, when a suspending agent may be included in tablets, when binders and lubricants may be included; or in a suspension in water or in a syrup or in an oil, or in a water/oil emulsion when flavoring, preserving, thickening, emulsifying agents may be included. The granules or the tablets may be coated.

The novel 21-desoxy-3-hydroxy-1,5-pregnadienes of our invention, such as are exemplified by the compounds defined by the general formula when Z is

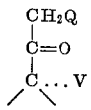

Q being hydrogen and halogen; V being hydrogen, hydroxy, and lower alkanoyloxy (except the 9β,11β-epoxy and 9,11-dehydro-derivatives, valuable as intermediates) in general possess progestational activity and as such may be used in a similar manner, and for alleviating the same disorders, as known progestational agents such as progesterone, ethisterone, and the like. Additionally, 21-halogeno-17α-hydroxy-1,5-pregnadiene-3-ols of our invention possess anti-inflammatory activity.

Representative of 21-desoxy-1,5-pregnadiene-3-ols of the general Formula I, which are therapeutically active as described above, are 1,5-pregnadiene-3β-ol-20-one, 1,5-pregnadiene-3β,17α-diol-20-one and the 3,17-diacetate ester thereof, 21 - fluoro - 1,5 - pregnadiene - 3β,17α - diol-20 - one, 9α,11β - dichloro - 17α - acetoxy - 1,5 - pregnadiene - 3β - ol - 20 - one and the 3α-epimers thereof.

Representative of 21 - oxygenated - 1,5 - pregnadiene-3-ols as defined by the general formula I when Z is

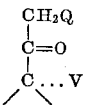

Q being hydroxy or an ester thereof; V being hydrogen, hydroxy, and lower alkanoyloxy, are compounds such as 1,5 - pregnadiene - 3β,11β,21 - triol - 20 - one; 1,5 - pregnadiene - 3β,11β,17α,21 - tetrol - 20 - one; and 1,5 - pregnadiene - 3β,17α,21 - triol - 11,20 - dione and their 6-methyl-, 6 - fluoro-, 16 - methylene-, 16α - methyl-, 16β-ethyl-, 16α-hydroxy-derivatives thereof as well as 9α-halogene-derivatives such as 6-fluoro-1,5-pregnadiene-3β,17α,21-triol-11,20-dione,
6-fluoro-1,5-pregnadiene-3β,11β,17α,21-tetrol-20-one,
6-fluoro-16-methylene-1,5-pregnadiene-3β,11β,17α,21-tetrol-20-one,
9,11β-dichloro-1,5-pregnadiene-3β,17α,21-triol-20-one,
6-fluoro-16α-methyl-1,5-pregnadiene-3β,11β,17α,21-tetrol-20-one,
6-fluoro-16α-methyl-1,5-pregnadiene-3β,17α,21-triol-11,20-dione,
6-methyl-9α-fluoro-1,5-pregnadiene-3β,11β,7α,21-tetrol-20-one,
6,16α-dimethyl-9α-fluoro-1,5-pregnadiene-3β,11β,17α,21-tetrol-20-one,
6,9α-difluoro-1,5-pregnadiene-3β,11β,17α,21-tetrol-20-one, and the 3α-epimers of the foregoing.

The 11 - substituted - 20 - keto - 1,5 - pregnadiene - 3-ols (except the 11α - hydroxy- and 9β,11β - epoxy - pregnadienes which are valuable mainly as intermediates) which also possess at least one hydroxyl group at the 17α- and 21-positions, possess cortical activity. In addition, some of these compounds, e.g., the 3(α and β),17α,21-trihydroxy-1,5-pregnadienes, possess anti-inflammatory activity and are used in the same manner as known corticoids such as prednisone and prednisolone.

In general, the pharmaceutically active 3-hydroxy-1,5-pregnadienes of our invention have an activity similar to the corresponding 3-keto-1,4-pregnadiene and may be administered in similar pharmaceutical forms and for the same indications for which the 3-keto-1,4-pregnadiene would be applicable. For example, 1,5 - pregnadiene-3β,11β,17α,21-tetrol-20-one and esters thereof possess anti-inflammatory activity similar to that of prednisolone and may be administered intramuscularly as the 3,21-diacetate in an aqueous suspension; orally in the form of tablets or capsules; or topically as a cream to which may be added other active ingredients such as neomycin sulfate, or in the form of opthalmic suspensions or as nasal sprays. In each instance, the pharmaceutical preparations are prepared according to procedures well known in the art.

The novel 3-hydroxy-1,5-dienes of our invention, e.g., 17α-methyl-1,5-androstadiene - 3β,17β - diol and the 3α-epimers thereof, are conveniently prepared by our process from the corresponding 3-keto-1,5-dienes, e.g., 17α-methyl-1,5-androstadiene-17β-ol-3-one, upon reduction by means of an alkali metal aluminum or borohydride (lithium aluminum hydride, sodium borohydride, etc.), or a metal alkoxide in the corresponding alcohol (e.g., aluminum isopropoxide in isopropanol or aluminum tert-butylate in tert-butanol), whereby there is formed both the 3β- and 3α-hydroxy isomers, e.g., the anabolic agents, 17α-methyl-1,5-androstadiene-3β,17β-diol and 17α-methyl-1,5-androstadiene-3α,17β-diol, separable via fractional crystallization and chromatographic techniques. Usually the 3β-hydroxy isomeric form predominates and is isolated and purified by crystallization. The 3α-hydroxy isomeric form may then generally be separated from the mother liquor of the 3β-ol by chromatography utilizing procedures well known in the art.

Prior to reduction of a 3-keto-1,5-diene to a 3-hydroxy-1,5-diene by the above-described process, any ketones present at C–17 or C–20, in the case of pregnadienes, should preferably be protected by a group such as an ethylene ketal or, in the case of those starting steroids having a cortical side chain, a bis-methylenedioxy derivative. Thus, for example, the 17,20;20,21-bis-methylenedioxy derivative of 1,5-pregnadiene-11β,17α,21-triol-3,20-dione is reduced with lithium aluminum hydride to the 17,20;20,21-bis-methylenedioxy derivative of 1,5-pregnadiene-3(α and β),11β,17α,21-tetrol-20-one, which upon mild acid hydrolysis will yield 1,5-pregnadiene-3(α and β),11β,17α,21-tetrol-20-one, separable via crystallization and chromatographic techniques to the 3α- and 3β-hydroxy isomers, both of which are valuable as anti-inflamatory agents.

While it is preferable to protect a reactive ketone other than at C–3 prior to reduction according to our process, the more hindered, less reactive ketones such as at C–11 need not necessarily be protected depending on the reaction conditions. For example, an 11-ketone group will not be affected if our process is carried out utilizing sodium borohydride at room temperature or aluminum isopropoxide in isopropyl alcohol. In addition, if the 20-ketone in a cortical side chain is sufficiently hindered, such as by the presence of a 17,21-acetonide or 17,21-diester, reduction with sodium borohydride or aluminum isopropoxide according to our process will convert the 3-keto to a 3-hydroxy without reduction of the 20-ketone. Additionally, a ketone such as at C–17 may advantageously be left unprotected if a hydroxy function is desired. For example, to prepare 1,5-androstadiene-3β,17β-diol according to our process, one may reduce either 1,5-androstadiene-3,17-dione or 1,5-androstadiene-17β-ol-3-one.

The starting compounds for our process thus may be any steroid having a 3-keto-$\Delta^{1,5}$- system in the A-ring with those compounds having a reactive ketone at C–17 or, in the case of pregnadienes, at C–20 being preferentially protected as described hereinabove. Thus, suitable starting steroids include the 20-ketals and (in the case of corticoids) the 17,20;20,21-bis-methylenedioxy derivatives of 3-keto-1,5-pregnadienes such as 1,5-pregnadiene-17α,21-diol-3,11,20-trione,
1,5-pregnadiene-11β,17α,21-triol-3,20-dione,
9α-fluoro-16α-methyl-1,5-pregnadiene-11β,17α,21-triol-3,20-dione,
6-methyl-1,5-pregnadiene-11β,17α,21-triol-3,20-dione,
6-fluoro-1,5-pregnadiene-11β,17α,21-triol-3,20-dione,
1,5-pregnadiene-3,20-dione,
17α-hydroxy-1,5-pregnadiene-3,20-dione and 17-lower alkanoates thereof,
9α,11β-dichloro-17α-acetoxy-1,5-pregnadiene-3,20-dione; and
3-keto-1,5-androstadienes such as 1,5-androstadiene-17β-ol-3-one,
17α-methyl-1,5-androstadiene-17β-ol-3-one, and
17-ethylenedioxy-1,5-androstadiene-3-one.

It is apparent from the foregoing that the 3-keto-$\Delta^{1,5}$-starting compounds of our novel process may be substituted at one or more carbons on the steroid nucleus, particularly at positions 6, 9, 11, and 16, which substituents are introduced by methods well known in the art.

The 3-keto-1,5-dienes useful as intermediates in our process are conveniently prepared from a 6-substituted intermediate (i.e., a 6-bromo- or 6-alkanoyloxy-) of the corresponding 3-keto-1,4-dienes by reaction with zinc in alcohol or magnesium in ether according to procedures described in U.S. Patent No. 2,908,696. Alternatively and preferably, a 3-keto-1,5-bis-dehydro starting compound of our process, e.g., 17α-methyl-1,5-androstadiene-17β-ol-3-one, is prepared by reaction of the corresponding 3-keto-$\Delta^{1,4}$- steroid, e.g., 17α-methyl-1-dehydrotestosterone, with a reagent of the group consisting of an alkali metal acetylide such as sodium acetylide, an alkali metal alkyl-substituted acetylide such as sodium methyl acetylide, and alkali metal hydride such as sodium hydride, an alkali metal amide such as sodium amide, or an alkali metal substituted alkyl derivative such as sodium triphenylmethyl, in a solvent which does not give up a proton according to procedures described in co-pending application, Ser. No. 251,744, of Masato Tanabe and Elliot L. Shapiro filed Jan. 16, 1963, now U.S. Pat. 3,127,428.

The ketone protective groups, e.g., ketals or bis-methylenedioxy functions, are preferably introduced into the molecule prior to the above-described conversion of a 3-keto-1,4-diene to a 3-keto-1,5-diene intermediate of our process. Thus, when preparing the novel 1,5-pregnadiene-3β,11β,17α,21-tetrol-20-one and 3α-epimer thereof by our process, preferably there is first prepared by known procedures the bis-methylenedioxy derivative of prednisolone which, in turn, upon reaction with sodium acetylide in dimethylformamide, for example, is converted to the corresponding 3 - keto - 1,5-diene, 17,20;20,21-bis-methylenedioxy-1,5-pregnadiene-11β-ol-3-one. Reaction of the latter compound with sodium borohydride according to our process yields 17,20;20,21-bis-methylenedioxy-1,5-pregnadiene-3(α and β), 11β-diol of this invention which upon mild hydrolysis according to known techniques is converted to 1,5-pregnadiene-3(α and β),11β,17α,21-tetrol-20-one, separable via chromatographic techniques into the 3α- and 3β-hydroxy isomers.

Similarly, 1-dehydroprogesterone, upon reaction with ethylene glycol according to known procedures, yields 20-ethylenedioxy-1,4-pregnadiene-3-one which, when subjected to the action of sodium acetylide in dimethylsulfoxide according to the above-described process of Tanabe and Shapiro, is converted to 20-ethylenedioxy-1,5-pregnadiene-3-one, convertible by reduction with sodium borohydride in water according to the process of this invention to 20-ethylenedioxy-1,5-pregnadiene-3(α and β)-ol. Cleavage of the 20-ketal is effected according to known techniques to obtain the free 20-ketone compound of Formula I, 1,5-pregnadiene-3(α and β)-ol-20 - one, separable via crystallization and chromatographic techniques to the 3α-hydroxy and 3β-hydroxy isomers.

Similarly, the 9 and 11, or the 11, and 16 substituted 3-hydroxy-1,5-dehydro-steroids of the general Formula I are preferably prepared from the corresponding 3-keto-1,5-dehydro steroid having the appropriate substituent present at the 9, 11, and 16 carbon atoms prior to reduction by means of a metal hydride or metal alkoxide. In turn, the appropriately substituted 3-keto-1,5-bis-dehydro intermediates are preferably prepared from the correspondingly substituted 3-keto-1,4-dienes by reaction with sodium acetylide in dimethylsulfoxide, for example. Introduction of ketone derivatives, or substituents at 9, 11, or 16 after conversion of a steroid to a 3-keto-1,5-diene or a 3-hydroxy-1,5-diene system may result in partial reversion to a 3-keto-1,4-diene system or low yields of substituted 3-hydroxy-1,5-bis-dehydro steroid.

In view of the foregoing, it is surprising that the 6-unsubstituted 3-hydroxy-1,5-dienes of Formula I, in addition to being therapeutically valuable per se are also valuable as intermediates in preparing other therapeutically valuable compounds, i.e., the 6-substituted 1,5-diene-3-hydroxy analogs as well as 6-substituted 3-keto-1,4-bis-dehydro steroids.

In the conversion of a 3-hydroxy-1,5-diene to a 3-keto-6-substituted-1,4-diene, the transformation is effected utilizing procedures analogous to known techniques. After protection of any ketones present at C–17 or C–20 (necessary only if a 6-alkyl is to be introduced via a Grignard reagent), selective epoxidation of the —$\Delta^5$-bond by means of a per-acid, followed by treatment of the resulting 5α,6α-epoxy with hydrofluoric acid or a Grignard reagent such as methyl magnesium iodide yields the corresponding 5α-hydroxy-6β-fluoro or 5α-hydroxy-6β-methyl-$\Delta^1$-3β-ol intermediate, respectively. Manganese dioxide oxidation of the 3β-hydroxy to a 3-keto group followed by dehydration of the 5α-hydroxy function with a reagent such as thionyl chloride in pyridine will yield the corresponding 3-keto-6β-fluoro- and 3-keto-6β-methyl-1,4-dienes, respectively. Epimerization to the 6α-isomers may be effected with a base such as potassium t-butoxide in t-butanol to obtain the 3-keto-6α-fluoro- and 3-keto-6α-methyl - 1,4-diene, respectively.

In the conversion of a 3-hydroxy-1,5-diene to a 6-substituted, e.g., a 6-fluoro- or a 6-methyl-3-hydroxy-1,5-diene, after epoxidation of the —$\Delta^5$-bond and treatment of the resulting 5α,6α - epoxy with hydrofluoric acid or a Grignard reagent, the resultant 5α-hydroxy-6β-fluoro- or 5α-hydroxy-6β-methyl-$\Delta^1$-3β-ol intermediates are esterified at C–3 (acetic anhydride in pyridine, for example) prior to dehydration of the 5α-hydroxy function with thionyl chloride in pyridine whereby is obtained the corresponding 3-acetoxy-6-fluoro- and 3-acetoxy-6-methyl-1,5-diene, respectively.

By way of example, the 17,20;20,21-bis-methylenedioxy derivative of 1,5-pregnadiene-3,11β,17α,21-tetrol-20-one is epoxidized on treatment with monoperphthalic acid to give the epoxy derivative, 5α,6α-epoxy-17,20;20,21-bis-methylenedioxy-1-pregnene-3,11β-diol, from which both the 6-methyl- and 6-fluoro-substituents may be introduced nto the molecule. Thus, the action of hydrofluoric acid on the epoxy intermediate yields the 5α-hydroxy-6β-fluoro intermediate, e.g., 5α-hydroxy-6β-fluoro-17,20;20,21-bis-methylenedioxy-1-pregnene-3,11β-diol; whereas, addition of a Grignard reagent such as methyl magnesium iodide with subsequent hydrolysis yields the 5α-hydroxy-6β-methyl compound, e.g., 5α-hydroxy-6β-methyl-17,20;20,21-bis-methylenedioxy-1-pregnene-3,11β - diol. Oxidation of the 3-hydroxy function of the aforementioned 5α-hydroxy-6-substituted derivatives to a 3-keto group with a reagent such as manganese dioxide or chromic acid followed by dehydration of the 5α-hydroxy function with a reagent such as thionyl chloride in a cold, basic medium, e.g., pyridine, will yield the 3-keto-6β-substituted-1,4-dienes, 6β-fluoro-17,20;20,21-bis - methylenedioxy - 1,4-pregnadiene-11β-ol-3-one and 6β-methyl-17,20;20,21-bis-methylenedioxy-1,4-pregnadiene-11β-ol-3-one, respectively. The 6α-substituted derivatives are prepared from the corresponding 6β-substituted isomers upon treatment with a base such as potassium t-butoxide in t-butanol. The 6α-substituted steroids thereby formed, e.g., 6α-fluoro-17,20; 20,21-bis-methylenedioxy-1,4-pregnadiene-11β-ol - 3 - one and 6α-methyl-17,20;20,21-bis-methylenedioxy-1,4 - pregnadiene-11β-ol-3-one, are then hydrolyzed by means of aqueous formic or aqueous acetic acid to form the known therapeutically valuable compounds 6α-fluoroprednisolone and 6α-methylprednisolone, respectively.

Alternatively, 5α-hydroxy-6 - substituted intermediates prepared as described above, i.e., 5α-hydroxy-6β-fluoro-17,20;20,21-bis-methylenedioxy-1-pregnene-3,11β - diol and α-hydroxy-6β-methyl-17,20;20,21-bis-methylenedioxy - 1-pregnene-3,11β-diol, may be esterified at C–3 such as with acetic anhydride in pyridine, and the corresponding 3-acetate esters then dehydrated with thionyl chloride in a cold, basic medium, e.g., pyridine, to obtain the 3-acetoxy-6-substituted-1,5-dienes, e.g., 6-fluoro-17,20;20,21-bis-methylenedioxy-1,5-pregnadiene-3,11β-diol 3-acetate and 6-methyl-17,20;20,21-bis-methylenedioxy-1,5-pregnadiene-11β-diol 3-acetate. Hydrolysis under mild acidic conditions will yield 6-fluoro- and 6-methyl-1,5-pregnadiene-11β,17α,21-tetrol-20-one, respectively.

In an analogous manner, treatment of 5α,6α-epoxy-17, ;20,21-bis-methylenedioxy-1-pregnene-3,11β-diol with hydrochloric acid yields 5α-hydroxy-6β-chloro-17,20;20, -bis-methylenedioxy-1-pregnene-3,11β-diol. Acetylation at C–3 followed by dehydration at C–5 with thionyl chloride and subsequent cleavage of the bis-methylenedioxy function will yield 6-chloro-1,5-pregnadiene-3,11β,17α,21-tetrol-20-one 3-acetate.

The novel 3-acyloxy-1,5-dienes of our invention are conveniently prepared from the corresponding 3-hydroxy compound via conventional techniques, such as those utilizing an acid anhydride or an acid halide in pyridine. Thus, for example, 17α-methyl-1,5-androstadiene-3β,17β-ol upon treatment with acetic anhydride in pyridine at room temperature yields the corresponding 3-monoacetate ester; whereas, treatment at higher temperatures, e.g., 75° C., for long periods of time will yield the corresponding 3,17-diacetate ester.

A mixed ester of a 3-hydroxy-1,5-bis-dehydro-androstane of our invention is conveniently prepared by first selectively esterifying the 3-hydroxy group and then esterifying other hydroxyl groups present in the molecule. For example, 17α-methyl-1,5-androstadiene-3β,17β-diol upon reaction with acetic anhydride in pyridine at room temperature is converted to the 3-mono-ester, 17α-methyl-1,5-androstadiene-3β,17β-diol 3-acetate. The 17-hydroxyl function may then be esterified such as with benzoyl chloride in pyridine at room temperature or with propionic acid anhydride in pyridine at elevated temperatures (i.e., about 80–100° C.) to obtain the respective mixed esters, i.e., 17α-methyl-1,5-androstadiene-3β,17β-ol 3-acetate 17-benzoate and 17α-methyl-1,5-androstadiene-3β,17β-diol 3-acetate 17-propionate, respectively.

When our process, whereby a 3-keto-1,5-diene is reduced to a 3-hydroxy-1,5-diene, is carried out utilizing an alkali metal borohydride or a Meerwein-Ponndorf-Verley reducing agent (i.e., a metal alkoxide) as the reducing agent, any ester group present in the starting compound generally remains unchanged. Thus, for example, 1,5-androstadiene-17β-ol-3-one 17-caproate, upon treatment with aluminum isopropoxide in isopropanol according to our process, will yield 1,6-androstadiene-3β,17β-diol 17-caproate and the 3α-epimer thereof. Reaction of the 3α- and 3β-hydroxy epimers (after separation thereof as described hereinabove) with an esterification agent, e.g., benzoyl chloride in pyridine, will yield mixed esters, e.g., 1,5-androstadiene-3β,17β-diol 3-benzoate 17-caproate and the 3α-epimer thereof.

Upon mild alkaline hydrolysis of a 3-acyloxy-1,5-diene of this invention, the ester group at C–3 is hydrolyzed without hydrolysis of ester groups of tertiary hydroxyl groups in the compound. For example, 17α-methyl-1,5-androstadiene-3β,17β-diol diacetate upon treatment with aqueous methanolic sodium carbonate at room temperature is converted to the 17-monoacetate, e.g., 17α-methyl-1,5-androstadiene-3β,17β-diol 17-acetate. When more rigorous hydrolyzing conditions are used, for example, hot, aqueous methanolic sodium hydroxide, ester groups of tertiary hydroxyl groups may also be hydrolyzed.

Another method for preparing mixed ester derivatives of our 3-hydroxy-1,5-dienes, therefore, is by selectively hydrolyzing under mild acid conditions the 3-acyloxy group in a polyester of a compound of Formula I, e.g., 1,5-pregnadiene-3β,17α-diol-20-one diacetate and re-esterifying the resultant 3-hydroxy diene, e.g., 1,5-pregnadiene-3β,17α-diol-20-one 17-acetate, with another acid reagent, e.g., succinic anhydride in pyridine, to obtain a mixed ester, e.g., 1,5-pregnadiene-3β,17α-diol-20-one 3-hemisuccinate 17-acetate.

The following are examples illustrating my invention. It is to be understood that the invention is not to be limited to the exact details of operation or to the exact showings and descriptions, as obvious modifications and equivalents will be apparent to one skilled in the art. The invention is, therefore, to be limited only by the scope of the appended claims.

EXAMPLE 1

*1,5-androstadiene-3-ol-17-one*

(A) *17-ethylene glycol ketal of 1,5-androstadiene-3, 17-dione.*—To 75 ml. of dimethyl sulfoxide add 40 ml. of a suspension of sodium acetylide (20%) in xylene. To this stirred mixture add 5 g. of 17-ethylene glycol ketal of 1,4-androstadiene-3,17-dione and continue stirring at room temperature for 20 minutes; then pour slowly into 1 l. of ice water. Separate the layers. Saturate the aqueous phase of the mixture with sodium chloride and then extract with methylene chloride. Combine the methylene chloride extracts with the original organic layer of the reaction mixture and wash with water, dry over magnesium sulfate and evaporate in vacuo to a residue of 17-ethylene glycol ketal of 1,5-androstadiene-3,17-dione. Purify by crystallization from acetone-hexane (containing a drop of pyridine).

(B) *17-ethylene glycol ketal of 1,5-androstadiene-3β-ol-17-one and the 3α-epimer thereof.*—Cool to about 10° C. a solution of 2 g. of 17-ethylene glycol ketal of 1,5-androstadiene-3,17-dione in 50 ml. of tetrahydrofuran; then add a solution of lithium aluminum hydride (0.75 g.) in 25 ml. of tetrahydrofuran while maintaining the temperature of the reaction mixture below 18° C. After one hour cautiously add 150 ml. of acetone to destroy any excess lithium aluminum hydride; then add about 1 l. of water and boil the mixture until the temperature reaches 94° C. Cool the reaction mixture to 15° C. and filter the resultant solid of substantially 17-ethylene glycol ketal of 1,5-androstadiene-3-(α and β)-ol-17-one. Dry the solid and crystallize from aqueous methanol to obtain 17-ethylene glycol ketal of 1,5-androstadiene-3β-ol-17-one. Evaporate the aqueous methanol filtrate in vacuo to a residue of substantially 17-ethylene glycol ketal of 1,5-androstadiene-3α-ol-17-one. Purify by dissolving in methylene chloride and chromatography on Florisil, eluting with methylene chloride with increasing amounts of acetone.

(C) *1,5-androstadiene-3β-ol-17-one and 1,5-androstadiene-3α-ol-17-one.*—Dissolve 1 g. of 17-ethylene glycol ketal of 1,5-androstadiene-3β-ol-17-one in 10 ml. of aqueous methanol (10 ml. methanol/1 ml. water), add 1 ml. of 10% aqueous sulfuric acid, and allow the mixture to stand at room temperature for 6 hours. Add water, then filter the resultant precipitate of 1,5-androstadiene-3β-ol-17-one.

In a similar manner, the 17-ethylene glycol ketal of 1,5-androstadiene-3α-ol-17-one is treated with dilute sulfuric acid in aqueous methanol and there is obtained 1,5-androstadiene-3α-ol-17-one.

EXAMPLE 2

*17α-methyl-1,5-androstadiene-3,17β-diol*

(A) *17α-methyl-1,5-androstadiene-17β-ol-3-one.*—Add 44 ml. of a suspension of 20% sodium acetylide in xylene to 100 ml. of dimethylsulfoxide in which is dissolved 5 g. of 17α-methyl-1,4-androstadiene-17β-ol-3-one. Stir the reaction mixture at room temperature for approximately 30 minutes, then pour the mixture slowly into 1.5 l. of ice water. Add sodium chloride to this mixture until the aqueous phase is saturated, then extract with methylene chloride. Combine the methylene chloride extracts, wash with water, then dry over magnesium sulfate and evaporate in vacuo on a steam bath to a crystalline residue of about 5 g. of 17α-methyl-1,5-androstadiene-17β-ol-3-one. Purify by crystallizing from acetone-hexane.

(B) *17α-methyl-1,5-androstadiene - 3β,17β - diol and 17α-methyl-1,5-androstadiene-3α,17β-diol.*—Cool to 2° C. a solution of 23.4 g. of 17α-methyl-1,5-androstadiene-17β-ol-3-one in 1.9 l. of methanol. Add 11.7 g. of sodium borohydride dissolved in 470 ml. of water while stirring the reaction mixture and maintaining the reaction temperature below 15° C. After the addition is complete, stir the reaction mixture for 45 minutes at about 5° C.; then cautiously add about 1 l. of 50% aqueous acetone. Boil the mixture until the temperature reaches 94° C. Cool to 15° C. and filter the resultant precipitate containing 17α-methyl-1,5-androstadiene-3β,17β-diol and the 3α-epimer thereof. Crystallize from methanol to obtain 17α-methyl-1,5-androstadiene-3β,17β-diol. Evaporate the methanol filtrate to a residue substantially of 17α-methyl-1,5-androstadiene-3α,17β-diol. Purify by chromatography on Florisil eluting with methylene chloride containing increasing amounts of acetone.

(C) Alternatively, the compound of this example is prepared as follows. To a solution of methyl magnesium iodide (prepared from 1.50 g. of magnesium and 3.77 ml. of methyl iodide) in 50 ml. of ether, there is added with stirring under an atmosphere of nitrogen a solution of 500 mg. of 1,5-androstadiene-3β-ol-17-one in 25 ml. of tetrahydrofuran. 75 ml. more of tetrahydrofuran is added and the mixture distilled until the vapor temperature reaches 60° C. The mixture is then refluxed for one hour, cooled and poured into cold 10% aqueous ammonium sulfate solution. A solid separates which is filtered, washed with water, dried and crystallized from methanol to give 17α-methyl-1,5-androstadiene-3β,17β-diol.

In a similar manner, 1,5-androstadiene-3α-ol-17-one is reacted with methyl magnesium iodide in ether and there is obtained 17α-methyl-1,5-androstadiene-3α,17β-diol.

Similarly, by substituting ethyl bromide for methyl iodide in the above procedure there is obtained the corresponding 17α-ethyl derivatives, i.e., 17α-ethyl-1,5-androstadiene-3β,17β-diol and 17α-ethyl-1,5-androstadiene-3α,17β-diol, respectively.

EXAMPLE 3

*Esters of 17α-methyl-1,5-androstadiene-3β,17β-diol and the 3α-epimer thereof*

(A) *17α-methyl-1,5-androstadiene-3β,17β - diol 3-acetate.*—Dissolve 1 g. of 17α-methyl-1,5-androstadiene-3β-17β-diol in 10 ml. of pyridine and 5 ml. of acetic anhydride. Allow the solution to stand at 25° C. for 18 hours; then add 1 ml. of water and pour the reaction mixture into ice cold aqueous hydrochloric acid. Extract the aqueous mixture with methylene chloride. Wash the combined extracts to neutrality with water, dry over magnesium sulfate, filter and evaporate to a residue of 17α-methyl-1,5-androstadiene-3β-17β-diol 3-acetate. Purify by crystallization from aqueous methanol.

In a similar manner, treat 17α-methyl-1,5-androstadiene-3α,17β-diol with acetic anhydride in pyridine and isolate as described above to give 17α-methyl-1,5-androstadiene-3α,17β-diol 3-acetate.

(B) *17α-methyl-1,5-androstadiene-3β,17β-diol dipropionate and 17α-methyl-1,5-androstadiene-3β,17β-diol 3-propionate.*—Heat a solution of 4 g. of 17α-methyl-1,5-androstadiene-3β,17β-diol in 80 ml. of pyridine and 40 ml. of propionic anhydride at 85° C. for 23 hours. Add 10 ml. of water and pour the reaction mixture into a solution of 80 ml. of concentrated hydrochloric acid in ice water. Extract the reaction mixture with methylene chloride. Wash the combined extracts to neutrality with water, dry over magnesium sulfate, filter, and evaporate to a residue. Chromatograph this residue on 45 g. of 100–200 mesh of silica gel, eluting with hexane containing increasing quantities of ether. The material eluted with ether-hexane (1:9) is 17α-methyl-1,5-androstadiene-3β,17β-diol dipropionate; the material eluted with ether-hexane (2:8) is 17α-methyl-1,5-androstadiene-3β,17β-diol 3-propionate. Purify both the mono- and di-esters by crystallization from methanol.

In a similar manner, by substituting 17α-methyl-1,5-androstadiene-3α,17β-diol for 17α-methyl-1,5-androstadiene-3β,17β-diol in the above procedure, there is obtained 17α-methyl-1,5-androstadiene - 3α,17β - diol dipropionate and 17α-methyl-1,5-androstadiene-3α,17β-diol 3-propionate, respectively.

(C) *17α-methyl-1,5-androstadiene-3β,17β-diol 17-propionate.*—To a solution of 1.8 g. of 17α-methyl-1,5-androstadiene-3β,17β-diol dipropionate in 90 ml. of methanol, add over a period of 20 minutes 191 mg. of sodium hydroxide in 10 ml. of water. Stir the reaction mixture at room temperature for an additional hour; then bring to neutrality with acetic acid. Evaporate the reaction mixture in vacuo to a small volume. Dissolve the residue in methylene chloride and wash the methylene chloride solution with aqueous sodium bicarbonate, then water. Dry over magnesium sulfate, filter, and evaporate to a residue of 17α-methyl-1,5-androstadiene-3β,17β-diol 17-propionate. Purify by crystallization from methanol.

In a similar manner, by substituting 17α-methyl-1,5-androstadiene-3α,17β-diol dipropionate for 17α-methyl-1,5-androstadiene-3β,17β-diol dipropionate in the above procedure there is obtained 17α-methyl-1,5-androstadiene-3α,17β-diol 17-propionate.

(D) *17α-methyl-1,5-androstadiene-3β,17β-diol dibenzoate and 17α-methyl-1,5-androstadiene-3β,17β-diol 3-benzoate.*—To a solution of 1 g. of 17α-methyl-1,5-androstadiene-3β,17β-diol in 20 ml. of pyridine cooled to 10° C., add with stirring 2.5 ml. of benzoyl chloride. Stir the reaction mixture at room temperature for 16 hours; then pour into water. Make slightly acid with concentrated hydrochloric acid; then extract with methylene chloride. Combine the methylene chloride extracts, wash to neutrality with water, dry over magnesium sulfate, filter, and evaporate to a residue. Chromatograph this residue on 50 g. of 100–200 mesh silica gel, eluting with hexane containing increasing amounts of ether. The material eluted with ether-hexane (1:9) is 17α-methyl-1,5-androstadiene- 3β,17β-diol dibenzoate; the material eluted with 100% ether is 17α-methyl-1,5-androstadiene-3β,17β-diol 3-benzoate. Purify both the monobenzoate and the dibenzoate esters by crystallizing from methanol.

In a similar manner, by substituting 17α-methyl-1,5-androstadiene-3α,17β-diol for 17α-methyl-1,5-androstadiene-3β,17β-diol in the above procedure, there is obtained 17α-methyl-1,5-androstadiene-3α,17β-diol dibenzoate and 17α-methyl-1,5-androstadiene-3α,17β-diol 3-benzoate, respectively.

(E) *17α-methyl-1,5-androstadiene-3β,17β-diol 3-decanoate.*—To a solution of 1 g. of 17α-methyl-1,5-androstadiene-3β,17β-diol in 20 ml. of pyridine cooled to 10° C., add with stirring 3 ml. of decanoyl chloride. Stir the reaction mixture at room temperature for 16 hours; then pour into water. Make the aqueous reaction mixture slightly acid with concentrated hydrochloric acid and extract with methylene chloride. Wash the combined methylene chloride extracts to neutrality with water, dry over magnesium sulfate, filter, and evaporate to a residue of substantially 17α-methyl-1,5-androstadiene-3β,17β-diol 3-decanoate. Purify by crystallization from methanol.

In a similar manner, 17α-methyl-1,5-androstadiene-3α,17β-diol is reacted with decanoyl chloride in pyridine and there is obtained 17α-methyl-1,5-androstadiene-3α,17β-diol 3-decanoate.

(F) *17α-methyl-1,5-androstadiene-3β,17β-diol 3-hemisuccinate and the sodium salt thereof.*—To 1 g. of 17α-methyl-1,5-androstadiene-3β,17β-diol in 10 ml. of pyridine add 1 g. of succinic anhydride. Heat the mixture on a steam bath for one hour; then cool and dilute with water. Filter the resultant solid which separates and wash with water and dry, yielding 17α-methyl-1,5-androstadiene-3β,17β-diol 3-hemisuccinate.

To a 1 g. of 17α-methyl-1,5-androstadiene-3β,17β-diol 3-hemisuccinate suspended in 100 ml. of water add 2 ml. of a 10% aqueous solution of sodium hydroxide. Evaporate the resultant aqueous solution in vacuo to a residue of substantially 17α-methyl-1,5-androstadiene-3β,17β-diol 3-sodium hemisuccinate.

By substituting 17α-methyl-1,5-androstadiene-3α,17β-diol for 17α-methyl-1,5-androstadiene-3β,17β-diol in the above procedure there is obtained 17α-methyl-1,5-androstadiene-3α,17β-diol 3-hemisuccinate and 17α-methyl-1,5-androstadiene-3α,17β-diol 3-sodium hemisuccinate, respectively.

(G) *17α-methyl-1,5-androstadiene-3β,17β-diol 3-sulfate and the potassium salt thereof.*—Stir for 2½ hours at room temperature a mixture of 10 g. of 17α-methyl-1,5-androstadiene-3β,17β-diol and 10 g. of pyridine-sulfur trioxide complex in 100 ml. of pyridine. Cool the mixture in an ice bath and add rapidly with vigorous stirring 10 ml. of 50% aqueous potassium hydroxide. Stir the mixture two minutes longer; then allow it to cool to room temperature without further stirring. Centrifuge the resultant two-phased system at room temperature and decant the pyridine layer. Wash the aqueous residue with pyridine and combine the pyridine washes with the original pyridine layer. Add ether to the pyridine solution with stirring until precipitation is complete. Filter the mixture and dry the residue to give substantially 17α-methyl-1,5-androstadiene-3β,17β-diol 3-potassium sulfate.

Dissolve 1 g. of 17α-methyl-1,5-androstadiene-3β,17β-diol 3-potassium sulfate in 100 ml. of water and bring the solution to neutrality by adding hydrochloric acid. Filter and dry the resultant solid of substantially 17α-methyl-1,5-androstadiene-3β,17β-diol 3-sulfate.

By substituting 17α-methyl-1,5-androstadiene-3α,17β-diol for 17α-methyl-1,5-androstadiene-3β,17β-diol in the above procedure there is obtained 17α-methyl-1,5-androstadiene-3α,17β-diol 3-potassium sulfate and 17α-methyl-1,5-androstadiene-3α,17β-diol 3-sulfate, respectively.

(H) *17α-methyl-1,5-androstadiene-3β,17β-diol 3-phosphate and the di-sodium salt thereof.*—To a solution of g. of 17α-methyl-1,5-androstadiene-3β,17β-diol in 10 ml. of pyridine add 1.8 g. of phosphorus oxychloride in 10 ml. of pyridine at −10° C. Stir the reaction mixture for one hour at −10° C.; then pour slowly with stirring onto crushed ice. Make the resultant aqueous mixture alkaline with a saturated aqueous sodium bicarbonate solution and wash with ether. Acidify the aqueous solution with hydrochloric acid. Filter and dry the resultant product of substantially 17α-methyl-1,5-androstadiene-3β,17β-diol 3-phosphate.

To 1 g. of 17α-methyl-1,5-androstadiene-3β,17β-diol 3-phosphate suspended in 100 ml. of water, add with stirring 2.2 ml. of a 10% aqueous solution of sodium hydroxide. Evaporate the resultant solution in vacuo to a residue substantially of 17α-methyl-1,5-androstadiene-3β,17β-diol 3-di-sodium phosphate.

By substituting 17α-methyl-1,5-androstadiene-3α,17β-diol for 17α-methyl-1,5-androstadiene-3β,17β-diol in the above procedure there is obtained 17α-methyl-1,5-androstadiene-3α,17β-diol 3-phosphate and 17α-methyl-1,5-androstadiene-3α,17β-diol 3-di-sodium phosphate, respectively.

(I) *17α-methyl-1,5-androstadiene-3β,17β-diol 3-(3'-cyclopentyl propionate).*—Treat 17α-methyl-1,5-androstadiene-3β,17β-diol with ω-cyclopentyl propionic acid anhydride in pyridine in a manner similar to that described in Example 3(A). Isolate the resultant product in the described manner to give 17α-methyl-1,5-androstadiene-3β,17β-diol 3-(3'-cyclopentyl propionate).

By substituting 17α-methyl-1,5-androstadiene-3α,17β-diol for 17α-methyl-1,5-androstadiene-3β,17β-diol in the above procedure there is obtained 17α-methyl-1,5-androstadiene-3α,17β-diol 3-(3'-cyclopentyl propionate).

EXAMPLE 4

*1,5-androstadiene-3,17β-diol*

(A) *1,5-androstadiene-17β-ol-3-one.*—Add 7 ml. of an approximately 18% suspension of sodium acetylide in xylene to a solution of 0.8 g. of 1,4-androstadiene-17β-ol-3-one in 16 ml. of dimethylsulfoxide. Stir the reaction mixture under an atmosphere of nitrogen for 50 minutes, then pour cautiously into ice water. Extract the aqueous mixture with ethyl acetate, then combine the extracts and evaporate to a residue of substantially 1,5-androstadiene-17β-ol-3-one. Purify by chromatography over 20 g. of Florisil eluting with ether-hexane. Combine like fractions which by ultra-violet evalution contain the 3-keto-1,5-diene system and evaporate to a residue. Crystallize the residue from acetone-hexane.

(B) *1,5-androstadiene-3,17β-diol.*—1,5-androstadiene-17β-ol-3-one is reduced with lithium aluminum hydride in tetrahydrofuran in a manner similar to that described in Example 1(B). The resultant mixture of 3α- and 3β-hydroxy-1,5-androstadiene-17β-ol is separated by chromatography on Florisil eluting with methylene chloride containing increasing amounts of acetone.

(C) Alternatively, the compound of this example is prepared in the following manner. Hydrolyze the 17-ethylene glycol ketal of 1,5-androstadiene-3,17-dione with aqueous methanol to which a small amount of dilute sulfuric acid has been added in the manner described in Example 1(C). Isolate the resultant product in the described manner to give 1,5-androstadiene-3,17-dione.

Reduce 1,5-androstadiene-3,17-dione with lithium aluminum hydride in tetraydrofuran according to the manner described in Example 1. Isolate and separate the resultant isomeric mixture in the described manner to yield 1,5-androstadiene-3β,17β-diol and 1,5-androstadiene-3α,17β-diol, respectively.

EXAMPLE 5

*1,5-androstadiene-3β,17β-diol 17-acetate*

(A) *1,5-androstadiene-3β,17β-diol diacetate.*—Heat a solution of 4 g. of 1,5-androstadiene-3β,17β-diol in 80 ml. of pyridine and 40 ml. of acetic anhydride at 85° C.

for 23 hours. Add 10 ml. of water and pour the reaction mixture into a solution of 80 ml. of concentrated hydrochloric acid in ice water. Extract the reaction mixture with methylene chloride, wash the combined extracts to neutrality with water, dry over magnesium sulfate, filter and evaporate to a residue of substantially 1,5-androstadiene-3β,17β-diol diacetate. Purify by crystallization from methanol.

In a similar manner, treat 1,5-androstadiene-3α,17β-diol with acetic anhydride in pyridine in the above manner to obtain 1,5-androstadiene-3α,17β-diol diacetate.

(B) *1,5 - androstadiene-3β,17β-diol 17-acetate.*—In a manner similar to that described in Example 3(C), except the reaction mixture is kept at −10° C. instead of at room temperature, treat 1,5-androstadiene-3β,17β-diol diacetate with methanolic sodium hydroxide. Isolate the resultant product in the described manner to obtain 1,5-androstadiene-3β,17β-diol 17-acetate. Purify by crystallization from methanol.

Similarly 1,5 - androstadiene-3α,17β-diol diacetate is treated with methanolic sodium hydroxide in the above manner to obtain 1,5-androstadiene-3α,17β-diol 17-acetate.

EXAMPLE 6

*17α-ethinyl-1,5-androstadiene-3,17β-diol*

Centrifuge 4 ml. of a 17% suspension of sodium acetylide in xylene and decant the supernatant liquid with 5 ml. of dimethylsulfoxide. Add the sodium acetylide in dimethylsulfoxide at room temperature to a solution of 500 mg. of 1,5-androstadiene-3β-ol-17-one in 17 ml. of dimethylsulfoxide. Stir the mixture at room temperature for 40 minutes; then add ice water, filter the resultant precipitate of substantially 17α-ethinyl-1,5-androstadiene-3β,17β-diol, wash with water and dry. Purify by crystallization from acetone-hexane.

In a similar manner, treat 1,5-androstadiene-3α-ol-17-one with sodium acetylide in dimethylsulfoxide in the above manner to obtain 17α-ethinyl-1,5-androstadiene-3α, 17β-diol.

In the above procedure by substituting sodium methyl acetylide for sodium acetylide, there is obtained 17α-methylethinyl-1,5-androstadiene-3β,17β-diol and 17α - methylethinyl-5-androstadiene-3α,17β-diol.

EXAMPLE 7

*17α-chloroethinyl-1,5-androstadiene-3,17β-diol*

To 560 mg. of lithium metal in 50 ml. of anhydrous ether, add dropwise over a period of 30 minutes a solution of 2.5 ml. of methyl iodide and 15 ml. of ether. Allow the mixture to stand for one hour at room temperature; then cool to 0° C. and add dropwise over a period of 15 minutes a solution of 3.1 ml. of 1,2-dichloroethylene in 20 ml. of ether. Stir the mixture at room temperature for 30 minutes and then add dropwise over a period of 15 minutes a solution of 1.15 g. of 1,5-androstadiene-3β-ol-17-one in 20 ml. of tetrahydrofuran. Stir the reaction mixture at room temperature for 18 hours; then cool to −60° C. and add 5 g. of solid ammonium chloride followed by water. Evaporate the ether and filter the resultant aqueous suspension. The residue on the filter comprising 17α-chloroethinyl-1,5-androstadiene-3β,17β-diol is washed with water and dried. Purify by chromatography on Florisil. Elute with hexane-ether (9:1), concentrate the eluates, and crystallize the residue from acetone-hexane.

By substituting 1,2-dibromoethylene for 1,2-dichloroethylene in the above procedure there is obtained 17α-bromoethinyl-1,5-androstadiene-3β,17β-diol.

In a similar manner, 1,5-androstadiene-3α-ol-17-one when treated with lithium chloroacetylide and lithium bromoacetylide in the above-described procedure, there is obtained 17α-chloroethinyl-1,5-androstadiene-3α,17β-diol and 17α-bromoethinyl-1,5-androstadiene-3α,17β-diol.

EXAMPLE 8

*9α-halogeno-1,5-androstadiene-3,11β-diol-17-one*

(A) *9α-fluoro - 17 - ethylenedioxy - 1,4-androstadiene-11β-ol-3-one.*—Reflux a solution of 1 g. of 9α-fluoro-1,4-androstadiene-11β-ol-3,17-dione in 50 ml. of anhydrous benzene and 0.23 ml. of ethylene glycol under a Dean-Stark separator for 4 hours in the presence of 10 mg. of p-toluenesulfonic acid. Cool the mixture and make slightly basic by the addition of aqueous 10% sodium hydroxide. Separate the organic layer, wash to neutrality with water, and concentrate in vacuo to a residue comprising 9α-fluoro - 17-ethylenedioxy-1,4-androstadiene-11β-ol-3-one. Purify by chromatography on Florisil, combine the eluates of hexane and up to 5% ether-hexane, and concentrate the combined eluates.

(B) *9α - fluoro - 17 - ethylenedioxy-1,5-androstadiene-11β-ol-3-one.*—In a manner similar to that described in Example 1(A), treat 9α - fluoro - 17 - ethylenedioxy-1,4-androstadiene-11β-ol-3-one with sodium acetylide in dimethylsulfoxide and isolate the resultant product in the described manner to give 9α-fluoro-17-ethylenedioxy-1,5-androstadiene-11β-ol-3-one.

(C) *9α - fluoro - 17 - ethylenedioxy-1,5-androstadiene-3,11β-diol.*—Reflux for about two hours a solution of 1 g. of 9α-fluoro-17-ethylenedioxy-1,5-androstadiene-11β-ol-3-one and 2 g. of purified aluminum isopropoxide in 50 ml. of dry isopropanol, at the same time slowly removing by distillation any acetone which is formed. Reflux until the test for acetone in the distillate (2,4-dinitrophenolhydrazone) is negative; then distill the excess isopropanol in vacuo. To the resultant residue add 15 ml. of a concentrated aqueous solution of sodium potassium tartrate. Remove by filtration the resultant precipitate comprising 9α - fluoro - 17 - ethylenedioxy-1,5-androstadiene-3β,11β-diol in admixture with 9α-fluoro-17-ethylenedioxy-1,5-androstadiene-3α,11β-diol. Crystallize from acetone-hexane to obtain 9α-fluoro-17-ethylenedioxy-1,5-androstadiene-3β,11β-diol. Concentrate the filtrate to dryness, dissolve the resultant residue in methylene chloride, and chromatograph on Florisil to obtain 9α-fluoro-17-ethylenedioxy-1,5-androstadiene-3α,11β-diol.

(D) *9α - fluoro-1,5-androstadiene-3,11β-diol-17-one.*—In a manner similar to that described in Example 1(C) treat each of 9α-fluoro-17-ethylenedioxy-1,5-androstadiene-3β,11β-diol and 9α - fluoro - 17 - ethylenedioxy-1,5-androstadiene-3α,11β-diol with aqueous sulfuric acid in methanol and isolate the resultant product as described to obtain, respectively, 9α-fluoro - 1,5 - androstadiene-3β, 11β-diol-17-one and 9α-fluoro-1,5-androstadiene-3α,11β-diol-17-one.

Similarly, 9α-bromo - 1,4 - androstadiene-11β-ol-3,17-dione may be subjected to the sequence of reactions outlined above, i.e., treat with ethylene glycol in the manner of Example 8(A) to obtain 9α-bromo-17-ethylenedioxy-1,4-androstadiene - 11β - ol-3-one, which upon treatment with sodium acetylide in dimethylsulfoxide in the manner of Example 8(B) yields 9α-bromo-17-ethylenedioxy-1,5-androstadiene-11β-ol-3-one. Reaction of the latter compound with aluminum isopropoxide in isopropanol in the manner of Example 8(C) yields 9α-bromo-17-ethylenedioxy-1,5-androstadiene - 3β,11β - diol and 9α-bromo-17-ethylenedioxy-1,5-androstadiene-3α,11β-diol, respectively, each of which is hydrolyzed in the manner of Example 8(D) whereby is obtained 9α-bromo-1,5-androstadiene-3β,11β-diol-17-one and 9α-bromo - 1,5 - androstadiene-3α, 11β-diol-17-one, respectively.

EXAMPLE 9

*9α-halogeno-17α-ethinyl-1,5-androstadiene-3,17β-diols*

(A) *9α - bromo - 17α - ethinyl-1,5-androstadiene-11β, 17β-diol-3-one.*—In a manner similar to that described in Example 2(A), 9α-bromo-17α-ethinyl-1,4-androstadiene-11β,17β-diol-3-one is reacted with sodium acetylide in dimethylsulfoxide. Isolate the resultant product in the described manner to obtain 9α-bromo-17α-ethinyl-1,5-androstadiene-11β,17β-diol-3-one.

Similarly,

9α-fluoro-17α-ethnyl-1,4-androstadiene-11β,17β-diol-3-one,
9α-chloro-17α-ethinyl-1,4-androstadiene-11β,17β-diol-3-one,
9α-fluoro-17α-ethinyl-1,4-androstadiene-17β-ol-3,11-dione, and
9α-bromo-17α-ethinyl-1,4-androstadiene-17β-ol-3,11-dione are each reacted with sodium acetylide in dimethylsulfoxide and the resultant products isolated in the described manner to obtain, respectively, 9α-fluoro-17α-ethinyl-1,5-androstadiene-11β,17β-diol-3-one,
9α-chloro-17α-ethinyl-1,5-androstadiene-11β,17β-diol-3-one,
9α-fluoro-17α-ethinyl-1,5-androstadiene-17β-ol-3,11-dione, and
9α-bromo-17α-ethinyl-1,5-androstadiene-17β-ol-3,11-dione.

(B) *9α - bromo - 17α - ethinyl - 1,5-androstadiene-3,11β,17β-triol.*—In a manner similar to that described in Example 2(B), treat 9α-bromo-17α-ethinyl-1,5-androstadiene-11β,17β-diol-3-one with sodium borohydride. Isolate the resultant product containing the 3α- and 3β-hydroxy epimers of 9α-bromo-17α-ethinyl-1,5-androstadiene-3,11β,17β-triol and separate the 3α- and 3β-epimers in the described manner to obtain 9α-bromo-17α-ethinyl-1,5-androstadiene-3β,11β,17β-triol and 9α-bromo-17α-ethinyl-1,5-androstadiene-3α,11β,17β-triol.

Similarly,

α-fluoro-17α-ethinyl-1,5-androstadiene-11β,17β-diol-3-one,
α-chloro-17α-ethinyl-1,5-17β-diol-3-one,
α-fluoro-17α-ethinyl-1,5-androstadiene-17β-ol-3,11-dione, and
α-bromo-17α-ethinyl-1,5-androstadiene-17β-ol-3,11-dione are each reacted with sodium borohydride in the above-described manner and the resulting 3α- and 3β-hydroxy epimers separated in the described manner to obtain, respectively, α-fluoro-17α-ethinyl-1,5-androstadiene-3β,11β,17β-triol,
α-fluoro-17α-ethinyl-1,5-androstadiene-3α,11β,17β-triol,
α-chloro-17α-ethinyl-1,5-androstadiene-3β,11β,17β-triol,
α-chloro-17α-ethinyl-1,5-androstadiene-3α,11β,17β-triol,
α-fluoro-17α-ethinyl-1,5-androstadiene-3β-17β-diol-11-one,
α-fluoro-17α-ethinyl-1,5-androstadiene-3α,17β-diol-11-one,
α-bromo-17α-ethinyl-1,5-androstadiene-3β,17β-diol-11-one, and
α-bromo-17α-ethinyl-1,5-androstadiene-3α,17β-diol-11-one.

EXAMPLE 10

*16-methyl-1,5-androstadiene-3-ols*

(A) *16β - methyl - 17 - ethylenedioxy - 1,4-androstadiene - 3,11 - dione.*—Treat 16β-methyl-1,4-androstaene-3,11,17-trione with ethylene glycol in a manner similar to that described in Example 8(A). Isolate and purify the resultant product in the described manner to obtain 16β - methyl - 17 - ethylenedioxy-1,4-androstadiene-3,11-one.

(B) *16β - methyl-17-ethylenedioxy-1,5-androstadiene-11-dione.*—In a manner similar to that described in Example 2(A), treat 16β - methyl - 17 - ethylenedioxy-1,4-androstadiene-3,11-dione with sodium acetylide in dimethylsulfoxide. Isolate and purify the resultant product in the described manner to obtain 16β-methyl-17-ethylenedioxy-1,5-androstadiene-3,11-dione.

(C) *16β - methyl-17-ethylenedioxy-1,5-androstadiene-3-ol-11-one.*—Cool to 2° C. a solution of 23.4 g. of 16β-methyl-17-ethylenedioxy-1,5-androstadiene-3,11-dione in 1.9 l. of methanol. Add 11.7 g. of sodium borohydride dissolved in 470 ml. of water while stirring the reaction mixture and maintaining the reaction temperature below 15° C. After the addition is complete, stir the reaction mixture for 45 minutes at about 5° C.; then cautiously add about 1 l. of 50% aqueous acetone. Boil the mixture until the mixture temperature reaches 94° C. Cool to 15° C. and filter the resultant precipitate comprising 16β-methyl - 17-ethylenedioxy-1,5-androstadiene-3β-ol-11-one and the 3α-epimer thereof, i.e., 16β-methyl-17-ethylenedioxy-1,5-androstadiene-3α-ol-11-one. The epimeric mixture is used without further purification in the following procedure 10(D).

(D) *16β - methyl-1,5-androstadiene-3-ol-11,17-dione.*—Dissolve 1 g. of 16β-methyl-17-ethylenedioxy-1,5-androstadiene-3(α and β)-ol-11-one (prepared as described in Example 10(C) in 10 ml. of aqueous methanol (10 ml. methanol/1 ml. water). Add 1 ml. of 10% aqueous sulfuric acid and allow the mixture to stand at room temperature for 6 hours. Add water; then filter the resultant precipitate comprising 16β-methyl-1,5-androstadiene-3β-ol-11,17-dione and the 3α-epimer thereof. Crystallize from aqueous methanol to obtain as precipitate 16β-methyl-1,5-androstadiene-3β-ol-11,17-dione.

Evaporate the aqueous methanol filtrate in vacuo to a residue comprising 16β - methyl-1,5-androstadiene-3α-ol-11,17-dione. Purify by dissolving in methylene chloride and chromatograph on Florisil eluting with methylene chloride with increasing amounts of acetone.

In a similar manner, 9α-bromo-16α-methyl-1,4-androstadiene-11β-ol-3,17-dione, treated as described in procedures 10(A) through 10(D), is converted to 9α-bromo-16α-methyl-1,5-androstadiene-3β,11β-diol-17-one and the 3α-epimer thereof, i.e., treat 9α-bromo-16α-methyl-1,4-androstadiene-11β-ol-3,17-dione with ethylene glycol as in Example 10(A) to obtain 9α-bromo-16α-methyl-17-ethylenedioxy-1,4-androstadiene-11β-ol-3-one which, in turn, is reacted with sodium acetylide in dimethylsulfoxide as described in Example 10(B) to obtain 9α-bromo-16α-methyl - 17-ethylenedioxy-1,5-androstadiene-11β-ol-3-one. Treat the resultant 3-keto-1,5-androstadiene with sodium borohydride according to the procedure of Example 10(C) to obtain the epimeric mixture of 9α-bromo-16α-methyl-17-ethylenedioxy-1,5-androstadiene-3β,11β-diol and the 3α-epimer thereof. Hydrolysis with methanolic-sulfuric acid as described in Example 10(D) yields the epimeric mixture of 9α-bromo-16α-methyl-1,5-androstadiene-3(α and β),11β-diol-17-one, separable by crystallization and chromatographic techniques in the described manner into 9α - bromo-16α-methyl-1,5-androstadiene-3β,11β-diol-17-one and 9α-bromo-16α-methyl-1,5-androstadiene-3α,11β-diol-17-one, respectively.

(E) Treat each of 9α-fluoro-16β-methyl-1,4-androstadiene-11β,17β-diol-3-one and 9α-chloro-16α-methyl-1,4-androstadiene-17β-ol-3,11-dione with sodium acetylide in dimethylsulfoxide in the manner described in Example 10(B) to obtain, respectively, 9α-fluoro-16β-methyl-1,5-androstadiene-11β,17β-diol-3-one and and 9α-chloro-16α-methyl-1,5-androstadiene-17β-ol-3,11-dione.

Treat each of the 3-keto-1,5-androstadienes prepared in the preceding paragraph with sodium borohydride and separate and purify the resultant product in a manner similar to that described in Example 2(B) to obtain, respectively, 9α-fluoro-16β-methyl-1,5-androstadiene-3β,11β,17β-triol, 9α-fluoro-16β-methyl-1,5-androstadiene-3α,11β,17β-triol,
9α-chloro-16α-methyl-1,5-androstadiene-
  3β,17β-diol-11-one and
9α-chloro-16α-methyl-1,5-androstadiene-
  3α,17β-diol-11-one.

EXAMPLE 11

*9α,11β-dihalogeno-17α-methyl-1,5-androstadiene-3,17β-diols*

(A) *9α,11β-dichloro - 17α - methyl-1,5-androstadiene-17β-ol-3-one*.—In a manner similar to that described in Example 1(A), react 9α,11β-dichloro-17α-methyl-1,4-androstadiene-17β-ol-3-one with sodium acetylide in dimethylsulfoxide and isolate and purify the resultant product in the described manner to give 9α,11β-dichloro-17α-methyl-1,5-androstadiene-17β-ol-3-one.

In a similar manner,

6α-fluoro-9α,11β-dichloro-17α-methyl-
  1,4-androstadiene-17β-ol-3-one,
6α,17α-dimethyl-9α,11β-dichloro-1,4-androstadiene-
  17β-ol-3-one, and
9α-bromo-11β-fluoro-17α-methyl-1,4-androstadiene-
  17β-ol-3-one are each reacted with sodium acetylide and the resultant products isolated and purified to yield, respectively, 6-fluoro-9α,11β-dichloro-17α-methyl-1,5-androstadiene-
  17β-ol-3-one,
6,17α-dimethyl-9α,11β-dichloro-1,5-androstadiene-
  17β-ol-3-one, and
9α-bromo-11β-fluoro-17α-methyl-1,5-androstadiene-
  17β-ol-3-one.

(B) *9α,11β - dichloro-17α - methyl - 1,5 - androstadiene-3,17β-diol*.—In a manner similar to that described in Example 8(C), react 9α,11β-dichloro-17α-methyl-1,5-androstadiene-17β-ol-3-one with aluminum isopropoxide in isopropanol, isolate the resultant product, and separate the mixture of 3α- and 3β-hydroxy epimers to give 9α,11β-dichloro - 17α - methyl-1,5-androstadiene-3β,17β-diol and 9α,11β-dichloro - 17α - methyl-1,5-androstadiene-3α,17β-diol, respectively.

Similarly, 6-fluoro-9α,11β-dichloro-17α-methyl-1,5-androstadiene-
  17β-ol-3-one,
6,17α-dimethyl-9α,11β-dichloro-17α-methyl-1,5-androstadiene-
  17β-ol-3-one, and
9α-bromo-11β-fluoro-17α-methyl-1,5-androstadiene-
  17β-ol-3-one are each treated with aluminum isopropoxide in isopropanol and the resultant epimeric mixture separated in a manner similar to that described in Example 8(C) to obtain, respectively, 6-fluoro-9α,11β-dichloro-17α-methyl-1,5-androstadiene-
  3β,17β-diol,
6-fluoro-9α,11β-dichloro-17α-methyl-1,5-androstadiene-
  3α,17β-diol,
6,17α-dimethyl-9α,11β-dichloro-17α-methyl-1,5-androstadiene-3β,17β-diol,
6,17α-dimethyl-9α,11β-dichloro-1,5-androstadiene-
  3α,17β-diol,
9α-bromo-11β-fluoro-17α-methyl-1,5-androstadiene-
  3β,17β-diol, and
9α-bromo-11β-fluoro-17α-methyl-1,5-androstadiene-
  3α,17β-diol.

EXAMPLE 12

*9α,11β-dihalogeno-16-alkyl-1,5-androstadiene-3-ols*

(A) *9α-bromo-11β-chloro-16α-ethyl-17-ethylenedioxy,1,4-androstadiene-3-one*.—In a manner similar to that described in Example 8(A), react 9α-bromo-11β-chloro-16α-ethyl-1,4-androstadiene-3,17-dione with ethylene glycol and isolate the resultant product as described to give 9α - bromo - 11β - chloro-16α-ethyl-17-ethylenedioxy-1,4-androstadiene-3-one.

In a similar manner, 9α,11β-dichloro-16α-methyl-1,4-androstadiene - 3,17 - dione and 9α,11β - dichloro - 16β-methyl-1,4-androstadiene-3,17-dione are each reacted with ethylene glycol and there is obtained 9α,11β-dichloro-16α-methyl-17-ethylenedioxy-1,4-androstadiene-3-one and 9α,11β - dichloro - 16β-ethyl-17-ethylenedioxy-1,4-androstadiene-3-one.

(B) *9α-bromo-11β-chloro-16α-ethyl-17-ethylenedioxy-1,5-androstadiene-3-one*.—In a manner similar to that described in Example 1(A), react 9α-bromo-11β-chloro-16α-ethyl-17-ethylenedioxy-1,4-androstadiene-3-one with sodium acetylide in dimethylsulfoxide and isolate and purify the resultant product to give 9α-bromo-11β-chloro-16α-ethyl-17-ethylenedioxy-1,5-androstadiene-3-one.

Similarly, 9α,11β - dichloro - 16α-methyl-17-ethylenedioxy-1,4-androstadiene-3-one and 9α,11β-dichloro-16β-methyl-17-ethylenedioxy-1,4-androstadiene-3-one are each reacted with sodium acetylide in dimethylsulfoxide in the above-described manner and there is obtained, respectively, 9α,11β-dichloro-16α-methyl-17-ethylenedioxy-1,5-androstadiene-3-one and 9α,11β-dichloro-16β-methyl-17-ethylenedioxy-1,5-androstadiene-3-one.

(C) *9α-bromo-11β-chloro-16α-ethyl-17-ethylenedioxy-1,5-androstadiene-3-ol*.—In a manner similar to that described in Example 8(C), react 9α-bromo-11β-chloro-16α-ethyl-17-ethylenedioxy-1,5-androstadiene-3-one with aluminum isopropoxide in isopropanol. Isolate the resultant product and separate into the 3α- and 3β-hydroxy epimers in the manner described to obtain 9α-bromo-11β-chloro - 16α - ethyl - 17-ethylenedioxy-1,5-androstadiene-3β - ol and 9α - bromo-11β - chloro-16α-ethyl-17-ethylenedioxy-1,5-androstadiene-3α-ol, respectively.

In a similar manner, 9α,11β-dichloro-16α-methyl-17-ethylenedioxy - 1,5 - androstadiene-3-one and 9α,11β-dichloro - 16β - methyl-17-ethylenedioxy-1,5-androstadiene-3-one are each treated with aluminum isopropoxide in isopropanol and the resultant products separated into 3α- and 3β-epimers to obtain, respectively, 9α,11β-dichloro-16α-methyl-17-ethylenedioxy-
  1,5-androstadiene-3β-ol,
9α,11β-dichloro-16α-methyl-17-ethylenedioxy-1,5-
  androstadiene-3α-ol,
9α,11β-dichloro-16β-ethyl-17-ethylenedioxy-1,5-
  androstadiene-3β-ol, and
9α,11β-dichloro-16β-methyl-17-ethylenedioxy-
  1,5-androstadiene-3α-ol.

(D) *9α - bromo - 11β - chloro - 16α - ethyl - 1,5 - androstadiene-3-ol-17-one*.—In a manner similar to that described in Example 1(C), treat 9α-bromo-11β-chloro-16α - ethyl - 17 - ethylenedioxy - 1,5 - androstadiene - 3β-ol with aqueous methanol and 10% sulfuric acid and isolate the resultant product to give 9α-bromo-11β-chloro-16α-ethyl-1,5-androstadiene-3β-ol-17-one.

In a similar manner,

9α-bromo-11β-chloro-16α-ethyl-17-ethylenedioxy-1,5-
  androstadiene-3α-ol,
9α,11β-dichloro-16α-methyl-17-ethylenedioxy-1,5-
  androstadiene-3β-ol,
9α,11β-dichloro-16α-methyl-17-ethylenedioxy-1,5-
  androstadiene-3α-ol,
9α,11β-dichloro-16β-methyl-17-ethylenedioxy-1,5-
  androstadiene-3β-ol, and
9α,11β-dichloro-16β-methyl-17-ethylenedioxy-1,5-
  androstadiene-3α-ol are each treated with aqueous methanol and 10% sulfuric acid to obtain, respectively, 9α-bromo-11β-chloro-16α-ethyl-1,5-androstadiene-3α-
  ol-17-one,
9α,11β-dichloro-16α-methyl-1,5-androstadiene-3β-ol-
  17-one, 9α,11β-dichloro-16α-methyl-1,5-androstadiene-3α-ol-17-one,
9α,11β-dichloro-16β-methyl-1,5-androstadiene-3β-ol-17-one, and
9α,11β-dichloro-16β-methyl-1,5-androstadiene-3α-ol-17-one.

EXAMPLE 13

*16-methylene-1,5-androstadiene-3,17β-diol*

(A) *16 - methylene - 1,4 - androstadiene - 17β - ol - 3-one.*—A one hundred ml. broth culture containing a 0.1% yeast extract concentration, 9.0 ml. of 0.2 M $KH_2PO_4$ and 9.0 ml. of 0.2 M $Na_2HPO_4$, contained in a 300 ml. Erlenmeyer flask, is seeded with 1 ml. of a 24-hour broth culture of *Corynebacterium simplex* (A.T.C.C. 6946). The flask is incubated at 28° C. for 24 hours. A second 300 ml. Erlenmeyer flask containing 150 mg. of sterile 16-methylene-4-androstene-17β-ol-3-one in 5.0 ml. of acetone is inoculated with the 24-hour culture of *Corynebacterium simplex* (A.T.C.C. 6946). The culture-containing steroid solution is incubated for 48 hours at 28° to 30° C.

After termination of the transformation period, the pH is 7.2–7.3. The culture is now directly extracted with three equal volumes of chloroform, and the solvent volumes are combined and concentrated on a steam bath to a residue comprising 16-methylene-1,4-androstadiene-17β-ol-3-one, which is purified by crystallization from ether-hexane.

(B) *16 - methylene - 1,5 - androstadiene - 17β - ol - 3-one.*—In a manner similar to that described in Example 1(A), react 16-methylene-1,4-androstadiene-17β-ol-3-one with sodium acetylide in dimethylsulfoxide. Isolate and purify the resultant product in the manner described to obtain 16-methylene-1,5-androstadiene-17β-ol-3-one.

(C) *16-methylene-1,5-androstadiene-3,17β-diol.*—In a manner similar to that described in Example 2(B), react 16-methylene-1,5-androstadiene-17β-ol-3-one with sodium borohydride. In the described manner, isolate the resultant product containing 16-methylene-1,5-androstadiene-3β,17β-diol and the 3α-epimer thereof. Crystallize the epimeric mixture from methanol to obtain a precipitate of 16-methylene-1,5-androstadiene-3β,17β-diol.

Evaporate the methanol filtrate to a residue substantially of 16-methylene - 1,5 - androstadiene - 3α,17β - diol. Purify by chromatography on Florisil, eluting with methylene chloride containing increasing amounts of acetone.

EXAMPLE 14

*3-methoxy-1,5-androstadiene-17-one*

To 1 g. of 1,5-androstadiene-3β-ol-17-one (the compound of Example 1(C)) dissolved in 10 ml. of tetrahydrofuran, add 0.5 g. of sodium hydride and 0.5 g. of methyl iodide. Warm the reaction mixture on a steam bath for one-half hour; then destroy any excess sodium hydride by the cautious addition of water. Concentrate the reaction mixture to a residue of 3β-methoxy-1,5-androstadiene-17-one. Purify by crystallization from acetone-hexane.

Similarly, treatment of 1,5-androstadiene-3α-ol-17-one,
9α-fluoro-1,5-androstadiene-3β,11β-diol-17-one,
9α-fluoro-1,5-androstadiene-3α,11β-diol-17-one,
9α,11β-dichloro-16α-methyl-1,5-androstadiene-3β-ol-17-one, and
9α,11β-dichloro-16α-methyl-1,5-androstadiene-3α-ol-17-one with sodium hydride and methyl iodide in the above manner will yield, respectively, 3α-methoxy-1,5-androstadiene-17-one,
3β-methoxy-9α-fluoro-1,5-androstadiene-11β-ol-17-one,
3α-methoxy-9α-fluoro-1,5-androstadiene-11β-ol-17-one,
3β-methoxy-9α,11β-dichloro-16α-methyl-1,5-androstadiene-17-one, and
3α-methoxy-9α,11β-dichloro-16α-methyl-1,5-androstadiene-17-one.

EXAMPLE 15

*3-methoxy-1,5-androstadiene-17β-ol*

Cool to about 10° C. a solution of 2 g. of 3β-methoxy-1,5-androstadiene-17-one in 50 ml. of tetrahydrofuran; then add a solution of 0.75 g. of lithium aluminum hydride in 25 ml. of tetrahydrofuran while maintaining the temperature of the reaction mixture below 18° C. After one hour, cautiously add 150 ml. of acetone to destroy any excess lithium aluminum hydride; then add about 1 l. of water and boil the mixture until the temperature reaches 94° C. Cool to 15° C. and filter the resultant solid of 3β-methoxy-1,5-androstadiene-17β-ol. Purify by crystallization from acetone-hexane.

Similarly, treatment of each of

3α-methoxy-1,5-androstadiene-17-one,
3β-methoxy-9α-fluoro-1,5-androstadiene-11β-ol-17-one,
3α-methoxy-9α-fluoro-1,5-androstadiene-11β-ol-17-one,
3β-methoxy-9α,11β-dichloro-16α-methyl-1,5-androstadiene-17-one, and
3α-methoxy-9α,11β-dichloro-16α-methyl-1,5-androstadiene-17-one with lithium aluminum hydride in tetrahydrofuran in the above manner will yield, respectively, 3α-methoxy-1,5-androstadiene-17β-ol,
3β-methoxy-9α-fluoro-1,5-androstadiene-11β,17β-diol,
3α-methoxy-9α-fluoro-1,5-androstadiene-11β,17β-diol,
3β-methoxy-9α,11β-dichloro-16α-methyl-1,5-androstadiene-17β-ol and
3α-methoxy-9α,11β-dichloro-16α-methyl-1,5-androstadiene-17β-ol.

EXAMPLE 16

*3-methoxy-17α-methyl-1,5-androstadiene-17β-ol*

(A) In a manner similar to that described in Example 2(C), react 3β-methoxy-1,5-androstadiene-17-one with methyl magnesium iodide. Isolate the resultant product in the described manner to give 3β-methoxy-17α-methyl-1,5-androstadiene-17β-ol. Purify by crystallization from aqueous methanol.

Similarly, treatment of each of

3α-methoxy-1,5-androstadiene-17-one,
3β-methoxy-9α-fluoro-1,5-androstadiene-11β-ol-17-one,
3α-methoxy-9α-fluoro-1,5-androstadiene-11β-ol-17-one,
3β-methoxy-9α,11β-dichloro-16α-methyl-1,5-androstadiene-17-one, and
3α-methoxy-9α,11β-dichloro-16α-methyl-1,5-androstadiene-17-one with methyl magnesium iodide in the above-described manner will yield, respectively, 3α-methoxy-17α-methyl-1,5-androstadiene-17β-ol,
3β-methoxy-9α-fluoro-17α-methyl-1,5-androstadiene-11β,17β-diol,
3α-methoxy-9α-fluoro-17α-methyl-1,5-androstadiene-11β,17β-diol,
3β-methoxy-9α,11β-dichloro-16α,17α-dimethyl-1,5-androstadiene-17β-ol, and
3α-methoxy-9α,11β-dichloro-16α,17α-dimethyl-1,5-androstadiene-17β-ol.

(B) Alternatively, the compound of this example is prepared in the following manner. Dissolve 1 g. of 17α-methyl-1,5-androstadiene-3,17β-diol (prepared as described in Example 2(B) without separation of the epimeric mixture (in 10 ml. of methanol to which is added 0.1 ml. of concentrated sulfuric acid. Allow the solution to stand for 3 hours; then neutralize with dilute aqueous sodium carbonate. Evaporate the reaction mixture to a residue containing a mixture of 3β-methoxy-17α-methyl-1,5-androstadiene-17β-ol and the 3α-epimer thereof. Crystallize the epimeric mixture from methanol to obtain a precipitate of 3β-methoxy-17α-methyl-1,5-androstadiene-17β-ol.

Evaporate the methanol filtrate to a residue substantially of 3α-methoxy-17α-methyl-1,5-androstadiene-17β-ol. Purify by chromatography on Florisil, eluting with hexane containing increasing amounts of acetone.

EXAMPLE 17

*3-methoxy-17α-ethinyl-1,5-androstadiene-17β-ol*

In a manner similar to that described in Example 6, react 3β-methoxy-1,5-androstadiene-17-one with sodium acetylide in dimethylsulfoxide. Isolate the resultant product in the described manner and purify by crystallization from acetone-hexane to yield 3β-methoxy-17α-ethinyl-1,5-androstadiene-17β-ol.

Similarly,

3α-methoxy-1,5-androstadiene-17-one,
3β-methoxy-9α-fluoro-1,5-androstadiene-11β-ol-17-one,
3α-methoxy-9α-fluoro-1,5-androstadiene-11β-ol-17-one,
3β-methoxy-9α-11β-dichloro-16α-methyl-1,5-androstadiene-17-one, and
3α-methoxy-9α,11β-dichloro-16α-methyl-1,5-androstadiene-17-one are each reacted with sodium acetylide in dimethylsulfoxide in the above-described manner to obtain, respectively, 3α-methoxy-17α-ethinyl-1,5-androstadiene-17β-ol,
3β-methoxy-9α-fluoro-17α-ethinyl-1,5-androstadiene-11β,17β-diol,
3α-methoxy-9α-fluoro-17α-ethinyl-1,5-androstadiene-11β,17β-diol,
3β-methoxy-9α,11β-dichloro-16α-methyl-17α-ethinyl-1,5-androstadiene-17β-ol, and
3α-methoxy-9α,11β-dichloro-16α-methyl-17α-ethinyl-1,5-androstadiene-17β-ol.

EXAMPLE 18

*9α-chloro-16α-methyl-1,5-androstadiene-3,11β-diol-17-one*

(A) *9β,11β-epoxy-16α-methyl-17-ethylenedioxy-1,4-androstadiene-3-one.*—In a manner similar to that described in Example 10(A), treat 9β,11β-epoxy-16α-methyl-1,4-androstadiene-3,17-dione with ethylene glycol. Isolate and purify the resultant product in the described manner to obtain 9β,11β-epoxy-16α-methyl-17-ethylenedioxy-1,4-androstadiene-3-one.

(B) *9β,11β-epoxy-16α-methyl-17-ethylenedioxy-1,5-androstadiene-3-one.*—In a manner similar to that described in Example 10(B), treat 9β,11β-epoxy-16α-methyl-17-ethylenedioxy-1,4-androstadiene-3-one with sodium acetylide in dimethylsulfoxide. Isolate and purify the resultant product in the described manner to obtain 9β,11β-epoxy-16α-methyl-17-ethylenedioxy-1,5-androstadiene-3-one.

(C) *9β,11β-epoxy-16α-methyl-17-ethylenedioxy-1,5-androstadiene-3-ol.*—In a manner similar to that described in Example 10(C), react 9β,11β-epoxy-16α-methyl-17-ethylenedioxy-1,5-androstadiene-3-one with sodium borohydride in water. Isolate the resultant product in the described manner to give a mixture of 9β,11β-*epoxy*-16α-methyl-17-ethylenedioxy-1,5-androstadiene-3β-ol and 9β,11β-epoxy-16α-methyl-17-ethylenedioxy-1,5-androstadiene-3α-ol.

(D) *9α-chloro-16α-methyl-17-ethylenedioxy-1,5-androstadiene-3,11β-diol.*—Saturate a solution of 200 mg. of the epimeric mixture of 9β,11β-epoxy-16α-methyl-17-ethylenedioxy-1,5-androstadiene-3-ol prepare in above Example 18(C) in 10 ml. of an alcohol-free chloroform solution with anhydrous hydrogen chloride while maintaining a reaction temperature of 0° C. Allow the solution to stand for 4 hours at 0° C.; then concentrate in vacuo to a residue comprising 9α-chloro-16α-methyl-17-ethylenedioxy-1,5-androstadiene-3β,11β-diol and 9α-chloro-16α-methyl-17 ethylenedioxy-1,5-androstadiene-3α,11β-diol.

(E) *9α-chloro-16α-methyl-1,5-androstadiene-3,11β-diol-17-one.*—Dissolve 1 g. of 9α-chloro-16α-methyl-17-ethylenedioxy-1,5-androstadiene-3(α and β),11β-diol (prepared as described above) in 10 ml. of aqueous methanol (10 ml. methanol/1 ml. water). Add 1 ml. of 10% aqueous sulfuric acid and allow the mixture to stand at room temperature for 6 hours. Add water; then filter the resultant precipitate comprising 9α-chloro-16α-methyl-1,5-androstadiene-3β,11β-diol-17-one and the 3α-epimer thereof. Crystallize the mixture from aqueous methanol to obtain as precipitate 9α-chloro-16α-methyl-1,5-androstadiene-3β,11β-diol-17-one.

Evaporate the aqueous methanol filtrate in vacuo to a residue comprising 9α-chloro-16α-methyl-1,5-androstadiene-3α,11β-diol-17-one. Purify by dissolving in methylene chloride and chromatographing on Florisil, eluting with methylene chloride containing increasing amounts of acetone.

EXAMPLE 19

*1,5,9(11)estratriene-3-ol-17-one*

Subject 1,4,9(11)-estratriene-3,17-dione to a sequence of reactions similar to those described in Example 18(A–C), i.e., treat 1,4,9(11)-estratriene-3,17-dione with ethylene glycol in the manner of Example 18(A) to yield 17-methylenedioxy-1,4,9(11)-estratriene-3-one. React the resultant 17-methylenedioxy with sodium acetylide in dimethylsulfoxide as in Example 18(B) to obtain 17-ethylenedioxy-1,5,9(11)-estratriene-3-one. Reaction with sodium borohydride in the manner of Example 18(C) yields a mixture of 17-ethylenedioxy-1,5,9(11)-estratriene-3β-ol and the 3α-epimer thereof. Hydrolyze this epimeric mixture with aqueous sulfuric acid in the manner of Example 10(D) to obtain a mixture of 1,5,9(11)-estratriene-3β-ol-17-one and the 3α-epimer thereof. Crystallize the epimeric mixture from aqueous methanol to obtain a precipitate of 1,5,9(11)-estratriene-3β-ol-17-one.

Evaporate the aqueous methanol filtrate in vacuo to a residue comprising 1,5,9(11)-estratriene-3α-ol-17-one. Purify by dissolving in methylene chloride and chromatographing on Florisil eluting with methylene chloride containing increasing amounts of acetone.

EXAMPLE 20

*Esters of 3-methoxy-1,5-androstadiene-17β-ols*

(A) *3-methoxy-1,5-androstadiene-17β-ol 17-acetate.*—Heat a solution of 2 g. of 3β-methoxy-1,5-androstadiene-17β-ol in 40 ml. of pyridine and 20 ml. of acetic anhydride at 85° C. for 16 hours. Add 5 ml. of water and pour the reaction mixture into a solution of 40 ml. of concentrated hydrochloric acid in ice water. Extract the reaction mixture with methylene chloride, wash the combined extracts to neutrality with water, dry over magnesium sulfate, and evaporate to a residue comprising 3β-methoxy-1,5-androstadiene-17β-ol 17-acetate. Purify by crystallization from methanol.

(B) In a similar manner, the following 3-methoxy-1,5-androstadiene-17β-ols are reacted with acetic anhydride in pyridine:

3α-methoxy-1,5-androstadiene-17β-ol,
3β-methoxy-9α-fluoro-1,5-androstadiene-11β,17β-diol,
3α-methoxy-9α-fluoro-1,5-androstadiene-11β,17β-diol,
3β-methoxy-9α,11β-dichloro-16α-methyl-1,5-androstadiene-17β-ol,
3α-methoxy-9α,11β-dichloro-16α-methyl-1,5-androstadiene-17β-ol,
3β-methoxy-17α-methyl-1,5-androstadiene-17β-ol,
3α-methoxy-17α-methyl-1,5-androstadiene-17β-ol,
3β-methoxy-17α-ethinyl-1,5-androstadiene-17β-ol, and
3α-methoxy-17α-ethinyl-1,5-androstadiene-17β-ol, to obtain the respective 17-acetate esters, ie., 3α-methoxy-1,5-androstadiene-17β-ol 17-acetate,
3β-methoxy-9α-fluoro-1,5-androstadiene-11β,17β-diol 17-acetate, 3α-methoxy-9α-fluoro-1,5-androstadiene-11β,17β-diol 17-acetate,
3β-methoxy-9α,11β-dichloro-16α-methyl-1,5-androstadiene-17β-ol 17-acetate,
3α-methoxy-9α,11β-dichloro-16α-methyl-1,5-androstadiene-17β-ol 17-acetate,
3β-methoxy-17α-methyl-1,5-androstadiene-17β-ol 17-acetate,
3α-methoxy-17α-methyl-1,5-androstadiene-17β-ol 17-acetate,
3β-methoxy-17α-ethinyl-1,5-androstadiene-17β-ol 17-acetate, and
3α-methoxy-17α-ethinyl-1,5-androstadiene-17β-ol 17-acetate.

EXAMPLE 21

*1,5-pregnadiene-3,11β,17α,21-tetrol-20-one*

(A) *17α,20;20,21 - bis - methylenedioxy-1,5-pregnadine-3,11-dione.*—Add 1.51 l. of 20% sodium acetylide in xylene to a solution of 37.8 g. of 17α,20;20,21-bis-methylenedioxy-1,4-pregnadiene-3,11-dione in 1.51 l. of dimethylformamide. Stir the reaction mixture at room temperature for four hours, then pour into 20 l. of ice water; extract the aqueous solution three times with 2 l. portions of methylene chloride. Combine the methylene chloride extracts, wash to neutrality with water, dry over magnesium sulfate, filter, and evaporate to a residue comprising 17α,20;20,21 - bis-methylenedioxy-1,5-pregnadiene-3,11-dione. Purify by crystallization from acetone.

(B) *17α,20;20,21-bis-methylenedioxy-1,5-pregnadiene-3,11β-diol.*—To a suspension of 19 g. of lithium aluminum hydride in a mixture of 500 ml. of tetrahydrofuran and 500 ml. of diethyl ether at 0° C. and under a nitrogen atmosphere, add dropwise a solution of 15 g. of 17α,20;20,21-bis-methylenedioxy-1,5-pregnadiene- 3,11-dione in 400 ml. of tetrahydrofuran. Stir under a nitrogen atmosphere for 60 hours at room temperature. Cool the mixture to 0° C. and decompose any remaining lithium aluminum hydride by the dropwise addition of a saturated solution of sodium sulfate. Filter the reaction mixture and dry the organic layer over anhydrous sodium sulfate and concentrate in vacuo to a residue comprising 17α,20;20,21 - bis-methylenedioxy-1,5-pregnadiene-3β,11β-diol and the 3α-epimer thereof. Chromatograph the epimeric mixture on alumina, employing the gradient elution methods, eluting with benzene containing increasing amounts of ether. Combine the like, early eluates, concentrate to a residue and recrystallize several times from acetone to obtain 17α,20;20,21-bis-methylenedioxy-1,5-pregnadiene-3β,11β-diol.

Combine the like, late benzene-chloroform eluate fractions, concentrate to a residue, recrystallize several times, and there is obtained 17α,20;20,21-bis-methylenedioxy-1,5-pregnadiene-3α,11β-diol.

(C) *1,5 - pregnadiene - 3,11β,17α,21-tetrol-20-one.*—Allow to stand at 25° C. for 18 hours a solution of 200 g. of 17α,20;20,21-bis-methylenedioxyl-1,5-pregnadiene-3β,11β-diol in 20 ml. of 80% aqueous formic acid containing 0.02 ml. of 60% perchloric acid. Pour the reaction mixture into water, extract with methylene chloride and wash the combined extracts with dilute alkali and then water. Dry the methylene chloride extracts over magnesium sulfate, filter, and concentrate in vacuo to a residue. Dissolve this residue in 20 ml. of methanol and add a solution of 10 mg. of sodium hydroxide in 1 l. of water. Allow this solution to stand for one hour; then neutralize with acetic acid and evaporate to a residue. Add chloroform to the residue, filter, and evaporate the chloroform extract to a residue comprising 1,5-pregnadiene-3β,11β,17α,21-tetrol-20-one. Purify by trituration of the residue with ethyl acetate followed by crystallization of the triturated solid from ethyl acetate.

Similarly, 17α,20;20,21-bis-methylenedioxy-1,5-pregnadiene-3α,11β-diol, upon reaction with formic acid and perchloric acid and isolation of the resultant product in the above described manner yields 1,5-pregnadiene-3α,11β,17α,21-tetrol-20-one.

(D) Alternatively, react the epimeric mixture of 17α,20;20,21 - bis - methylenedioxy-1,5-pregnadiene-3β,11β-diol and the corresponding 3α-hydroxy compound, prepared as described in Example 21(B), (prior to separation into the respective 3α- and 3β-hydroxy components) with formic acid and perchloric acid in a manner similar to that described in Example 21(C). Isolate the resultant product in the described manner to obtain a mixture of 1,5-pregnadiene-3β,11β,17α,21-tetrol-20-one and the 3α-epimer thereof. Crystallize the epimeric mixture from methanol to obtain a precipitate of 1,5-pregnadiene-3β,11β,17α,21-tetrol-20-one.

Concentrate the methanol filtrate to a residue. Dissolve this residue in methylene chloride and chromatograph on Florisil eluting with methylene chloride containing increasing amounts of methanol. Combine like fractions and concentrate the combined fractions to a residue comprising 1,5-pregnadiene-3α,11β,17α,21 tetrol-20-one. Purify by crystallization from methanol.

EXAMPLE 22

*Derivatives of 1,5-pregnadiene-3,11β,17α,21-tetrol-20-one*

(A) In a manner similar to that described in Example 21(A), react each of the following compounds with sodium acetylide in dimethylsulfoxide;

9α-fluoro-17α,20;20,21-bis-methylenedioxy-1,4-pregnadiene-11β-ol-3-one,
6α-methyl-17α,20;20,21-bis-methylenedioxy-1,4-pregnadiene-11β-ol-3-one,
6α-fluoro-17α,20;20,21-bis-methylenedioxy-1,4-pregnadiene-11β-ol-3-one,
16α-methyl-17α,20;20,21-bis-methylenedioxy-1,4-pregnadiene-11β-ol-3-one,
16β-methyl-17α,20;20,21-bis-methylenedioxy-1,4-pregnadiene-11β-ol-3-one,
9α-fluoro-16α-methyl-17α,20;20,21-bis-methylenedioxy-1,4-pregnadiene-11β-ol-3-one,
6α-methyl-9α-fluoro-17α,20;20,21-bis-methylenedioxy-1,4-pregnadiene-11β-ol-3-one,
6α,16α-dimethyl-9α-fluoro-17α,20;20,21-bis-methylenedioxy-1,4-pregnadiene-11β-ol-3-one,
6α,9α-difluoro-17α,20;20,21-bis-methylenedioxy-1,4-pregnadiene-11β-ol-3-one,
16-methylene-17α,20;20,21-bis-methylenedioxy-1,4-pregnadiene-11β-ol-3-one, and
17α,20;20,21-bis-methylenedioxy-1,4-pregnadiene-11β,14α-diol-3-one.

Isolate the respective resultant products in a manner similar to that described to obtain, respectively, 9α-fluoro-17α,20;20,21-bis-methylenedioxy-1,5-pregnadiene-11β-ol-3-one,
6-methyl-17α,20;20,21-bis-methylenedioxy-1,5-pregnadiene-11β-ol-3-one,
6-fluoro-17α,20;20,21-bis-methylenedioxy-1,5-pregnadiene-11β-ol-3-one,
16α-methyl-17α,20;20,21-bis-methylenedioxy-1,5-pregnadiene-11β-ol-3-one,
16β-methyl-17α,20;20,21-bis-methylenedioxy-1,5-pregnadiene-11β-ol-3-one,
9α-fluoro-16α-methyl-17α,20;20,21-bis-methylenedioxy-1,5-pregnadiene-11β-ol-3-one,
6-methyl-9α-fluoro-17α,20;20,21-bis-methylenedioxy-1,5-pregnadiene-11β-ol-3-one,
6,16α-dimethyl-9α-fluoro-17α,20;20,21-bis-methylenedioxy-1,5-pregnadiene-11β-ol-3-one,
6,9α-difluoro-17α,20;20,21-bis-methylenedioxy-1,5-pregnadiene-11β-ol-3-one,
16-methylene-17α,20;20,21-bis-methylenedioxy-1,5-pregnadiene-11β-ol-3-one, and
17α,20;20,21-bis-methylenedioxy-1,5-pregnadiene-11β,14α-diol-3-one.

(B) Each of the 1,5-pregnadienes prepared as described in Example 22(A) is reacted with lithium aluminum hydride according to the procedure of Example 21(B) to obtain a mixture of the 3α-hydroxy and 3β-hydroxy epimers of each of the following:

9α-fluoro-17α,20;20,21-bis-methylenedioxy-1,5-pregnadiene-3,11β-diol,
6-methyl-17α,20;20,21-bis-methylenedioxy-1,5-pregnadiene-3,11β-diol,
6-fluoro-17α,20;20,21-bis-methylenedioxy-1,5-pregnadiene-3,11β-diol,
16α-methyl-17α,20;20,21-bis-methylenedioxy-1,5-pregnadiene-3,11β-diol,
16β-methyl-17α,20;20,21-bis-methylenedioxy-1,5-pregnadiene-3,11β-diol,
9α-fluoro-16α-methyl-17α,20;20,21-bis-methylenedioxy-1,5-pregnadiene-3,11β-diol,
6-methyl-9α-fluoro-17α,20;20,21-bis-methylenedioxy-1,5-pregnadiene-3,11β-diol,
6,16α-dimethyl-9α-fluoro-17α,20;20,21-bis-methylenedioxy-1,5-pregnadiene-3,11β-diol,
6,9α-difluoro-17α,20;20,21-bis-methylenedioxy-1,5-pregnadiene-3,11β-diol,
16-methylene-17α,20;20,21-bis-methylenedioxy-1,5-pregnadiene-3,11β-diol, and
17α,20;20,21-bis-methylenedioxy-1,5-pregnadiene-3,11β,14α-triol, respectively.

(C) In a manner esimilar to that described in Example 21(D), each 3-hydroxy-1,5-pregnadiene prepared as described in above Example 22(B) is reacted with formic acid and perchloric acid and the respective resultant products isolated in the described manner whereby is obtained, respectively, 9α-fluoro-1,5-pregnadiene-3β,11β,17α,21-tetrol-20-one,
9α-fluoro-1,5-pregnadiene-3α,11β,17α,21-tetrol-20-one,
6-methyl-1,5-pregnadiene-3β,11β,17α,21-tetrol-20-one,
6-methyl-1,5-pregnadiene-3α,11β,17α,21-tetrol-20-one,
6-fluoro-1,5-pregnadiene-3β,11β,17α,21-tetrol-20-one,
6-fluoro-1,5-pregnadiene-3α,11β,17α,21-tetrol-20-one,
16α-methyl-1,5-pregnadiene-3β,11β,17α,21-tetrol-20-one,
16α-methyl-1,5-pregnadiene-3α,11β,17α,21-tetrol-20-one,
16β-methyl-1,5-pregnadiene-3β,11β,17α,21-tetrol-20-one,
16β-methyl-1,5-pregnadiene-3α,11β,17α,21-tetrol-20-one,
9α-fluoro-16α-methyl-1,5-pregnadiene-3β,11β,17α,21-tetrol-20-one,
9α-fluoro-16α-methyl-1,5-pregnadiene-3α,11β-17α,21-tetrol-20-one,
6-methyl-9α-fluoro-1,5-pregnadiene-3β,11β,17α,21-tetrol-20-one,
6-methyl-9α-fluoro-1,5-pregnadiene-3α,11β,17α,21-tetrol-20-one,
6,16α-dimethyl-9α-fluoro-1,5-pregnadiene-3β,11β,17α,21-tetrol-20-one,
6,16α-dimethyl-9α-fluoro-1,5-pregnadiene-3α,11β,17α,21-tetrol-20-one,
6,9α-difluoro-1,5-pregnadiene-3β,11β,17α,21-tetrol-20-one,
6,9α-difluoro-1,5-pregnadiene-3α,11β,17α,21-tetrol-20-one,
16-methylene-1,5-pregnadiene-3β,11β,17α,21-tetrol-20-one,
16-methylene-1,5-pregnadiene-3α,11β,17α,21-tetrol-20-one,
1,5-pregnadiene-3β,11β,16α,17α,21-pentol-20-one, and
1,5-pregnadiene-3α,11β,14α,17α,21-pentol-20-one.

EXAMPLE 23

*1,5-pregnadiene-3,17α,21-triol-11,20-diones*

(A) *17α,20;20,21 - bis-methylenedioxy - 1,5 - pregnadiene-3,11-diones.*—In a manner similar to that described in Example 21(A), react 17α,20;20,21-bis-methylenedioxy-1,4-pregnadiene-3,11-dione with sodium acetylide in dimethylsulfoxide and isolate and purify the resultant product in the described manner to give 17α,20;20,21-bis-methylenedioxy-1,5-pregnadiene-3,11-dione.

In a similar manner,

16α-methyl-17α,20;20,21-bis-methylenedioxy-1,4-pregnadiene-3,11-dione,
16β-methyl-17α,20;20,21-bismethylenedioxy-1,4-pregnadiene-3,11-dione, and
9α-fluoro-17α,20;20,21-bis-methylenedioxy-1,4-pregnadiene-3,11-dione are each reacted with sodium acetylide in dimethylsulfoxide and the resultant products isolated and purified to give respectively, 16α-methyl-17α,20;20,21-bis-methylenedioxy-1,5-pregnadiene-3,11-dione,
16β-methyl-17α,20;20,21-bis-methylenedioxy-1,5-pregnadiene-3,11-dione, and
9α-fluoro-17α,20;20,21-bis-methylenedioxy-1,5-pregnadiene-3,11-dione.

(B) *17α,20;20,21 - bis - methylenedioxy 1,5 - pregnadiene - 3 - ol - 11 - ones.*—Dissolve 1.5 g. of 17α,20;20,21-bis-methylenedioxy-1,5-pregnadiene-3,11-dione in 120 ml. of methanol and cool to about 10° C. Add a solution of 0.8 g. of sodium borohydride in 30 ml. of water while maintaining the reaction temperature below 18° C. After one hour, cautiously add about 15 ml. of acetone to destroy any excess sodium borohydride. Add 100 ml. of water to the reaction mixture and boil until the temperature reaches 94° C. Cool to about 15° C. and filter the insoluble fraction comprising a mixture of 17α,20;20,21-bis-methylenedioxy-1,5-pregnadiene-3β-ol-11-one and 17α,20;20,21 - bis - methylenedioxy - 1,5 - pregnadiene - 3α-ol-11-one. Use the epimeric mixture without further purification in procedure C below.

In a similar manner,

16α - methyl - 17α, 20;20,21 - bis - methylenedioxy - 1,5-pregnadiene-3,11-dione,
16β - methyl - 17α,20;20,21 - bis - methylenedioxy - 1,5-pregnadiene-3,11-dione, and
9α - fluoro - 17α,20;20,21 - bis - methylenedioxy - 1,5-pregnadiene-3,11-dione are each reacted with sodium borohydride in water and the resultant products isolated as described to obtain, respectively, product mixtures comprising 16α - methyl - 17α, 20;20,21 - bis - methylenedioxy - 1,5-pregnadiene-3β-ol-11-one and the
3α-hydroxy epimer thereof,
16β - methyl - 17α,20;20,21 - bis - methylenedioxy - 1,5-pregnadiene-3β-ol-11-one and the
3α-hydroxy epimer thereof, and
9α - fluoro - 17α,20;20,21 - bis - methylenedioxy - 1,5-pregnadiene-3β-ol-11-one and the
3α-hydroxy epimer thereof.

(C) *1-5 - pregnadiene-3,17α,21 - triol - 11,20-dione.*—Allow to stand at 25° C. for 18 hours a solution of the epimeric mixture of 17α,20;20,21-bis-methylenedioxy 1,5-pregnadiene-3β-ol-11-one and the corresponding 3α-hydroxy compound, prepared as described in Example 23(B), in 20 ml. of 80% aqueous formic acid containing 0.02 ml. of 60% perchloric acid. Pour the reaction mixture into water, extract with methylene chloride, and wash the combined extracts with dilute alkali and then water. Dry the methylene chloride extracts over magnesium sulfate, filter, and concentrate in vacuo to a residue. Dissolve this residue in 20 ml. of methanol and add a solution of 10 mg. of sodium hydroxide in 1 ml. of water. Allow this solution to stand for one hour; then neutralize with acetic acid and evaporate to a residue comprising a mixture of 1,5-pregnadiene-3β,17α,21-triol-11,20-dione and the 3α-epimer thereof. Crystallize the epimeric mixture from methanol to obtain a precipitate of 1,5-pregnadiene-3β-17α,21-triol-3,20-dione.

Concentrate the methanol filtrate to a residue. Dissolve this residue in methylene chloride and chromatograph on Florisil, eluting with methylene chloride containing increasing amounts of methanol. Combine like fractions and concentrate to a residue comprising, 1,5-pregnadiene-3α,17α,21-triol-11,20-dione. Purify by crystallization from methanol.

Similarly, the epimeric mixtures of

16α - methyl - 17α, 20;20,21 - bis - methylenedioxy - 1,5-pregnadiene-3-ol-11-one, 16β - methyl - 17α,20;20,21 - bis - methylenedioxy - 1,5-pregnadiene-3-ol-11-one, and 9α - fluoro - 17α,20;20,21 - bis - methylenedioxy - 1,5-pregnadiene-3-ol-11-one, prepared as described in Example 23(B), are each reacted with formic acid and perchloric acid and the resultant products isolated and purified as described above to yield, respectively, 16α - methyl - 1,5 - pregnadiene - 3β,17α,21 - triol - 11,20-dione, 16α - methyl - 1,5 - pregnadiene - 3α,17α,21 - triol - 11,20-dione, 16β - methyl - 1,5 - pregnadiene - 3β,17α,21 - triol - 11,20-dione, 16β - methyl - 1,5 - pregnadiene - 3α,17α,21 - triol - 11,20-dione, 9α - fluoro - 1,5 - pregnadiene - 3β,17α,21-triol - 11, 20-dione, and 9α - fluoro - 1,5 - pregnadiene - 3α,17α,21 - triol - 11,20-dione.

EXAMPLE 24

9α,11β - dichloro - 1,5 - pregnadiene - 3,17α,21 - triol-20-one (A) 9α,11β - dichloro - 1,5 - pregnadiene - 17α,21-diol - 3,20 - dione - 17α,21 - acetonide.—To a solution of 5.8 g. of 9α,11β - dichloro - 1,4 - pregnadiene - 17α,21-diol-3,20-dione 17α,21-acetonide in 120 ml. of anhydrous tetrahydrofuran, add 1.5 g. of sodium amide. Stir the mixture at reflux temperature under a nitrogen atmosphere overnight; then cool and pour into 800 ml. of a cool, saturated, aqueous boric acid solution. Separate the organic layer from the aqueous solution; then extract the aqueous solution with ether. Combine the ether extracts with the original organic layer and evaporate in vacuo to a residue comprising 9α,11β-dichloro-1,5-pregnadiene-17α,21 - diol - 3,20 - dione 17α,21 - acetonide. Purify by chromatography on Florisil, eluting with benzene containing increasing amounts of chloroform.

(B) 9α,11β - dichloro - 1,5 - pregnadiene - 3,17α,21 - triol - 20 - one - 17α, 21 - acetonide.—React 9α,11β-dichloro - 1,5 - pregnadiene - 17α,21 - diol - 3,20 - dione 17α,21-acetonide with sodium borohydride in water in a manner similar to that described in Example 23(B). Isolate the resultant product in the described manner to obtain a mixture of 9α,11β-dichloro-1,5-pregnadiene-3β,17α,21-triol-20-one 17α,21-acetonide and 9α,11β-dichloro - 1,5 - pregnadiene - 3α,17α,21-triol 20-one 17α,21-acetonide which is used without further purification in the following procedure (C).

(C) 9α,11β - dichloro - 1,5 - pregnadiene -3,17α,21 - triol - 20 - one.—To a solution of 1 g. of the epimeric mixture comprising 9α,11β - dichloro - 1,5-pregnadiene-3β,17α,21 - triol - 20 - one 17α,21 - acetonide and the 3α-epimer thereof in 15 ml. of glacial acetic acid at 80° C., add 10 ml. of water over a ten minute period during which time the temperature is allower to rise to 95° C. Cool the reaction mixture and filter the resultant solid comprising a mixture of 9α,11β-dichloro-1,5-pregnadiene-3β,17α,21-triol-20-one and the 3α-epimer thereof. Crystallize the epimeric mixture from methanol and filter the precipitate of 9α,11β-dichloro-3β,17α,21-one.

Concentrate the methanol filtrate to a residue. Dissolve his residue in methylene chloride and chromatograph on Florisil, eluting with methylene chloride containing increasing amounts of methanol. Combine like fractions and concentrate to a residue comprising 9α,11β-dichloro-1,5-pregnadiene-3α,17α,21-triol-20-one. Purify by crystallization from methanol.

In a similar manner, each of the following compounds, i.e.,

9α-11β-dichloro-16α-methyl-1,4-pregnadiene-17α,21-diol-3,20-dione 17α,21-acetonide, 9α-11β-dichloro-16β-methyl-1,4-pregnadiene-17α,21-diol-3,20-dione 17α,21-acetonide, 9α-chloro-1,4-pregnadiene-11β,17α,21-triol-3,20-dione 17α,21-acetonide, 9α-chloro-16α-methyl-1,4-pregnadiene-11β,17α,21-triol-3,20-dione 17α,21-acetonide, and 9α-chloro-16β-methyl-1,4-pregnadiene-11β,17α,21-triol-3,20-dione 17α,21-acetonide are reacted with sodium amide in the manner of Example 24(A) to obtain the corresponding respective 1,5-pregnadiene analogs, each of which in turn is reacted with sodium borohydride in water in the manner of Example 24(B) whereby is obtained the following respective epimeric mixtures; 9α,11β - dichloro - 16α-methyl-1,5-pregnadiene-3β,17α,21-triol-20-one 17α,21-acetonide and the 3α-epimer thereof, 9α,11β-dichloro-16β-methyl-1,5-pregnadiene, 3β, 17α,21-triol-20-one 17,21-acetonide and the 3α-epimer thereof, 9α - chloro-1,5-pregnadiene-3β,11β,17α,21-tetrol-20-one 17α,21-acetonide and the 3α-epimer thereof, 9α-chloro-16α-methyl - 1,5-pregnadiene-3β,11β,17α,21-tetrol-20-one 17α,21-acetonide and the 3α-epimer thereof, and 9α-chloro-16β-methyl - 1,5 - pregnadiene - 3β,11β,17α,21-tetrol-20-one 17α,21-acetonide and the 3α-epimer thereof. Hydrolyze each of the foregoing epimeric mixtures with 50% aqueous acetic acid in the manner described in Example 24(C) and the resultant epimeric mixtures are isolated and purified in a manner similar to that described to obtain 9α,11β-dichloro-16α-methyl-1,5-pregnadiene-3β,17α,21-triol-20-one, 9α,11β-dichloro-16α-methyl-1,5-pregnadiene-3α,17α,21-triol-20-one, 9α,11β-dichloro-16β-methyl-1,5-pregnadiene-3β,17α,21-triol-20-one, 9α,11β-dichloro-16β-methyl-1,5-pregnadiene-3α,17α,21-triol-20-one, 9α-chloro, 1,5-pregnadiene-3β,11β,17α,21-tetrol-20-one, 9α-chloro-1,5-pregnadiene-3α-11β,17α,21-tetrol-20-one, 9α-chloro-16α-methyl-1,5-pregnadiene-3β,11β,17α,21-tetrol-20-one, 9α-chloro-16α-methyl-1,5-pregnadiene-3α,11β,17α,21-tetrol-20-one, 9α-chloro-16β-methyl-1,5-pregnadiene-3β,11β,17α,21-tetrol-20-one, and 9α-chloro-16β-methyl-1,5-pregnadiene-3α,11β,17α,21-tetrol-20-one.

EXAMPLE 25

1,5-pregnadiene-3,17α-diol-20-one (A) 20 - ethylenedioxyl - 1,4 - pregnadiene - 17α-ol-3-one.—Treat 1,4-pregnadiene-17α-ol-3,20-dione with ethylene glycol in the presence of p-toluenesulfonic acid in a manner similar to that described in Example 8(A); isolate and purify the resultant product in a manner similar to that described to obtain 20-ethylenedioxy-1,4-pregnadiene-17α-ol-3-one.

(B) 20 - ethylenedioxy - 1,5-pregnadiene-17α-ol-one.— React 20-ethylenedioxy-1,4-pregnadiene-17α-ol-3-one with sodium acetylide in dimethylsulfoxide and isolate and purify the resultant product in a manner similar to that described in Example 1(A) to obtain 20-ethylenedioxy-1,5-pregnadiene-17α-ol-3-one.

(C) 20 - ethylenedioxy-1,5-pregnadiene-3,17α-diol.—In a manner similar to that described in Example 23(B), treat 20-ethylenedioxy-1,5-pregnadiene-17α-ol-3-one with sodium borohydride in water and isolate the resultant product comprising a mixture of 20-ethylenedioxy-1,5-pregnadiene-3β,17α-diol and 20-ethylenedioxy-1,5-pregnadiene-3α,17α-diol.

(D) *1,5-pregnadiene-3,17α-diol-20-one.*—Dissolve 5 g. of the epimeric mixture of 20-ethylene-dioxy-1,5-pregnadiene-3,17α-diol in 10 ml. of aqueous methanol (10 ml. methanol/1 ml. water). Add 1 ml. of 10% aqueous sulfuric acid and allow the mixture to stand at room temperature for 6 hours. Add water; then filter the resultant precipitate comprising a mixture of 1,5-pregnadiene-3β,17α-diol-20-one and the 3α-epimer thereof. Crystallize the epimeric mixture from aqueous methanol and filter the resultant precipitate of 1,5-pregnadiene-3β,17α-diol-20-one.

Evaporate the methanol filtrate to a residue. Chromatograph the residue on Florisil, eluting with methylene chloride containing increasing amounts of acetone. Combine like fractions and evaporate in vacuo to a residue of substantially 1,5-pregnadiene-3α,17α-diol-20-one. Purify by crystallization from methanol.

In a manner similar to that described above, 9α-11β-dichloro-1,4-pregnadiene-3,20-dione, 21-fluoro-1,4-pregnadiene-17α-ol-3,20-dione, 1,4 - pregnadiene-3,20-dione, 6α-methyl-1,4-pregnadiene-3,20-dione, 6α - fluoro-1,4-pregnadiene-3,20-dione, and 16α-methyl - 1,4 - pregnadiene-3,20-dione are each converted to their respective 20-ethylene glycol ketal by reaction with ehylene glycol in a manner similar to that described in Example 25(A), each of which in turn is reacted with sodium acetylide in dimethylsulfoxide in the manner of Example 25(B) to obtain, respectively, 9α,11β-dichloro-20-ethylenedioxy-1,5-pregnadiene-3-one,
20-ethylenedioxy-21-fluoro-1,5-pregnadiene-17α-ol-3-one,
20-ethylenedioxy-1,5-pregnadiene-3-one,
6-methyl-20-ethylenedioxy,1,5-pregnadiene-3-one,
6-fluoro-20-ethylenedioxy-1,5-pregnadiene-3-one, and
16α-methyl-20-ethylenedioxy-1,5-pregnadiene-3-one.

Reduction of each of the foregoing with sodium borohydride in a manner similar to that described in Example 23(B) yields the following respective epimeric mixtures; 9α,11β-dichloro-20-ethylenedioxy - 1,5-pregnadiene - 3β-ol and the 3α-epimer thereof, 20-ethylenedioxy-21-fluoro,1,5-pregnadiene-3β,17α-diol and the 3α-epimer thereof, 20-ethylenedioxy-1,5-pregnadiene-3β-ol and the 3α-epimer thereof, 6-methyl-20-ethylenedioxy-1,5-pregnadiene-3β-ol and the 3α-epimer thereof, 6-fluoro-20-ethylenedioxy-1,5-pregnadiene-3β-ol and the 3α-epimer thereof, and 16α-methyl-20-ethylenedioxy-1,5-pregnadiene-3β-ol and the 3α-epimer thereof. Conversion of the 20-ethylene glycol derivatives to the 20-ketone function is effected with sulfuric acid in methanol according to the procedure of Example 25(D) to obtain the following respective compounds;

9α,11β-dichloro-1,5-pregnadiene-3β-ol-20-one,
9α,11β-dichloro-1,5-pregnadiene-3α-ol-20-one,
21-fluoro-1,5-pregnadiene-3β,17α-diol-20-one,
21-fluoro-1,5-pregnadiene-3α,17α-diol-20-one,
1,5-pregnadiene-3β-ol-20-one,
1,5-pregnadiene-3α-ol-20-one,
6-methyl-1,5-pregnadiene-3β-ol-20-one,
6-methyl-1,5-pregnadiene-3α-ol-20-one,
6-fluoro-1,5-pregnadiene-3β-ol-20-one,
6-fluoro-1,5-pregnadiene-3α-ol-20-one,
16α-methyl-1,5-pregnadiene-3β-ol-20-one, and
16α-methyl-1,5-pregnadiene-3α-ol-20-one.

EXAMPLE 26

*9α,11β-dichloro-1,5-pregnadiene-3,17α-diol-20-one 17-acetate*

(A) *9α,11β-dichloro-1,5-pregnadiene-17α-ol-3,20-dione 17-acetate.*—In a manner similar to that described in Example 23(A), react 9α,11β-dichloro-1,4-pregnadiene-17α-ol-3,20-dione 17-acetate with sodium acetylide in dimethylsulfoxide. Isolate and purify the resultant product in a manner similar to that described to give 9α,11β-dichloro-1,5-pregnadiene-17α-ol-3,20-dione 17-acetate.

In a similar manner, 1,4-pregnadiene-17α-ol-3,20-dione 17-acetate and 9α-fluoro-1,4-pregnadiene-11β,17α-diol-3,20-dione 17-acetate are each reacted with sodium acetylide in dimethylsulfoxide whereby is obtained 1,5-pregnadiene-17α-ol-3,20-dione 17-acetate and 9α-fluoro-1,5-pregnadiene-11β,17α-diol-3,20-dione 17-acetate.

(B) *9α,11β-dichloro-1,5-pregnadiene-3,17α-diol-20-one 17-acetate.*—In a manner similar to that described in Example 23(B), react 9α,11β-dichloro-1,5-pregnadiene-17α-ol-3,20-dione 17-acetate with sodium borohydride in water. Isolate the resultant product in the manner described to obtain a mixture comprising 9α,11β-dichloro-1,5-pregnadiene-3β,17α-diol-20-one 17-acetate and the 3α-epimer thereof. Crystallize the epimeric mixture from aqueous methanol to obtain a precipitate of 9α,11β-dichloro-1,5-pregnadiene-3β,17α-diol-20-one 17-acetate.

Evaporate the methanol filtrate in vacuo to a residue comprising 9α,11β - dichloro-1,5-pregnadiene-3α,17α-diol-20-one 17-acetate. Purify by chromatography on Florisil, eluting with methylene chloride containing increasing amounts of methanol. Combine like fractions and concentrate the combined fractions to a residue comprising 9α,11β - dichloro-1,5-pregnadiene-3α,17α-diol-20-one 17-acetate.

In a similar manner, reaction of 1,5-pregnadiene-17α-ol-3,20-dione 17-acetate and 9α-fluoro-1,5-pregnadiene-11β,17α-diol-3,20-dione 17-acetate with sodium borohydride in water and isolation and purification of the resultant product in the above-described manner will yield 1,5-pregnadiene-3β,17α-diol-20-one 17-acetate, 1,5-pregnadiene-3α,17α-diol-20-one 17-acetate, 9α-fluoro-1,5-pregnadiene-3β,11β,17α-triol-20-one 17-acetate and 9α-fluoro-1,5-pregnadiene-3α,11β,17α - triol-20-one 17-acetate, respectively.

EXAMPLE 27

*3-methoxy-1,5-pregnadiene-11β,17α,21-triol-20-one*

(A) *3 - methoxy-17α,20;20,21 - bis-methylenedioxy-1,5-pregnadiene-11β-ol.*—In a manner similar to that described in Example 16(B), treat a mixture of 17α,20;20,21 - bis - methylenedioxy-1,5-pregnadiene-3β,11β-diol and the 3α-hydroxy epimer thereof (prepared as described in Example 21(B)) with methanolic-sulfuric acid. Isolate the resultant product in the described manner to obtain a mixture comprising 3β-methoxy-17α,20;20,21-bis-methylenedioxy-1,5-pregnadiene-11β-ol and the 3α-methoxy epimer thereof.

(B) *3 - methoxy - 1,5 - pregnadiene-11β,17α,21-triol-20-one.*—In a manner similar to that described in Example 21(C), treat the epimeric mixture prepared in Example 27(A) with formic acid and perchloric acid. Isolate the resultant product in the described manner to obtain a mixture of 3β-methoxy-1,5-pregnadiene-11β,17α,21-triol-20-one and the 3α-methoxy epimer thereof. Crystallize the epimeric mixture from methanol to obtain a precipitate of 3β-methoxy-1,5-pregnadiene-11β,17α,21-triol-20-one.

Concentrate the methanol filtrate to a residue. Chromatograph the residue on Florisil, eluting with methylene chloride containing increasing amounts of methanol. Combine like fractions and concentrate the combined fractions to a residue comprising 3α-methoxy-1,5-pregnadiene-11β,17α,21-triol-20-one. Purify by crystallization from methanol.

EXAMPLE 28

*3-methoxy-9α,11β-dichloro-1,5-pregnadiene-17α-ol-20-one 17-acetate*

In a manner similar to that described in Example 14, react 9α,11β - dichloro-1,5-pregnadiene-3β,17α-diol-20-one 17-acetate in tetrahydrofuran with sodium hydride and methyl iodide. Isolate and purify the resultant product in the described manner to give 3β-methoxy-9α,11β-dichloro-1,5-pregnadiene-17α-ol-20-one 17-acetate.

Similarly, 9α,11β-dichloro-1,5-pregnadiene-3α,17α-diol-20-one 17-acetate, 1,5-pregnadiene-3β,17α-diol-20-one 17-acetate, and 1,5-pregnadiene-3α,17α-diol-20-one 17-acetate are each reacted with sodium hydride and methyl iodide in the above manner and the resultant products isolated and purified to give, respectively, 3-α-methoxy-9α,11β-dichloro-1,5-pregnadiene-17α-ol-20-one 17-acetate, 3β-methoxy-1,5-pregnadiene-17α-ol-20-one 17-acetate, and 3α-methoxy-1,5-pregnadiene-17α-ol-20-one 17-acetate.

EXAMPLE 29

*1,5-pregnadiene-3,11β,17α,21-tetrol-20-one 3,21-diesters*

(A) *1,5 - pregnadiene-3,11β,17α,21-tetrol-20-one 3,21-diacetate.*—Dissolve 1 g. of 1,5-pregnadiene-3β,11β,17α,21-tetrol-20-one in 10 ml. of pyridine and 5 ml. of acetic anhydride. Allow the solution to stand at 25% C. for 8 hours; then add 1 ml. of water. Pour the reaction mixture into ice cold hydrochloric acid and extract the aqueous mixture with methylene chloride. Wash the combined extracts to neutrality with water, dry over magnesium sulfate and evaporate to a residue in vacuo comprising 1,5-pregnadiene-3β,11β,17α,21-tetrol-20-one 3,21-diacetate.

In a similar manner, 1,5 - pregnadiene-3α,11β,17α,21-tetrol-20-one 3,21-diacetate is prepared from the corresponding 3α-hydroxy compound by reaction with acetic anhydride in pyridine.

(B) *1,5-pregnadiene-3,11β,17α,21-tetrol-20-one 3,21-dibenzoate.*—React each of 1,5-pregnadiene-3β,11β,17α,21-tetrol-20-one and 1,5-pregnadiene-3α,11β,17α,21-tetrol-20-one with benzoyl chloride in pyridine in the manner described in Example 3(D). Isolate the respective resultant products in the manner described to obtain 1,5-pregnadiene-3β,11β,17α,21-tetrol-20-one 3,21-dibenzoate and 1,5-pregnadiene-3α,11β,17α,21-tetrol-20-one 3,21-dibenzoate.

In a manner similar to that described above in procedures A and B, each of the compounds prepared in Examples 21 and 22 are converted to their respective 3,21-diacetate and 3,21-dibenzoate esters.

EXAMPLE 30

*9α-fluoro-16α-methyl-1,5-pregnadiene-3,11β,17α,21-tetrol-20-one 3-decanoate 21-acetate*

(A) *9α - fluoro-16α-methyl-17α,20;20,21-bis-methylenedioxy-1,5-pregnadiene-3,11β-diol 3 - decanoate.*—The isomeric mixture of 9α-fluoro-16α-methyl-17α,20;20,21-bis-methylenedioxy - 1,5 - pregnadiene-3β,11β-diol and 9α-fluoro - 16α - methyl-17α,20;20,21-bis-methylenedioxy-1,5-pregnadiene-3α,11β-diol (prepared as described in Example 22) is separated into the respective 3α- and 3β-hydroxy epimers in a maner similar to that described in Example 21(B), i.e., by chromatography of the epimeric mixture on alumina, eluting with benzene containing increasing amount of ether.

In a manner similar to that described in Example 3(E), eat each of

9α-fluoro-16α-methyl-17α,20;20,21-bis-methylene-
  dioxy-1,5-pregnadiene-3β,11β-diol and
9α-fluoro-16α-methyl-17α,20;20,21-bis-methylenedi-
  oxy-1,5-pregnadiene, 3α,11β-diol with decanoyl chloride in pyridine and isolate the resultant product in the described manner to obtain 9α-fluoro-16α - methyl - 17α,20;20,21-bis-methylenedioxy-1,5-pregnadiene-3β,11β-diol 3-decanoate and the 3α-epimer thereof.

(B) *9α - fluoro-16α-methyl-1,5-pregnadiene-3,11β,17α,21-tetrol-20-one 3-decanoate.*—In a manner similar to that described in Example 21(C), treat each of 9α-fluoro-16α-methyl-17α-20;20,21-bis-methylene-
  dioxy-1,5-pregnadiene-3β,11β-diol 3-decanoate and
9α-fluoro-16α-methyl-17α,20;20,21-bis-methylenedi-
  oxy-1,5-pregnadiene-3α,11β-diol 3-decanoate with 80% aqueous formic acid and 60% perchloric acid and isolate the resultant product in the described manner to obtain, respectively, 9α-fluoro-16α-methyl-1,5-pregnadienes - 3β,11β,17α,21-tetrol-20-one 3-decanoate and 9α-fluoro-16α-methyl-1,5-pregnadiene-3β,11β,17α,21 - tetrol-20-one 3-decanoate.

(C) *9α-fluoro-16α-methyl-1,5-pregnadiene - 3,11β,17α,21-tetrol-20-one 3-decanoate 21-acetate.*—In a manner similar to that described in Example 3(A), treat each of 9α-fluoro-16α-methyl-1,5-pregnadiene-3β,11β,17α,
  21-tetrol-20-one 3-decanoate and
9α-fluoro-16α-methyl-1,5-pregnadiene-3α,11β,
  17α,21-tetrol-20-one 3-decanoate with acetic anhydride in pyridine and isolate the resultant product in the described manner to give, respectively, 9α-fluoro-16α-methyl-1,5-pregnadiene-3β,11β,17α,21 - tetrol-20-one 3-decanoate 21-acetate and 9α-fluoro-16α-methyl-1,5-pregnadiene-3α,11β,17α,21-tetrol-20-one 3 - decanoate 21-acetate.

EXAMPLE 31

*3-esters of 9α-11β-dichloro-1,5-pregnadiene-3,17α-diol-20-one 17-acetate*

(A) In a manner similar to that described in Example 3(A), react 9α,11β-dichloro-1,5-pregnadiene-3β,17α-diol-20-one 17-acetic with acetic acid in pyridine. Isolate and purify the resultant product in the described manner to obtain 9α,11β-dichloro-1,5-pregnadiene-3β,17α-diol - 20-one diacetate.

By substituting propionic anhydride for acetic anhydride in the above procedure, there is obtained 9α,11β-dichloro-1,5-pregnadiene-3β,17α-diol-20-one 3-propionate 17-acetate.

(B) In a manner similar to that described in Example 3(D), react 9α,11β-dichloro-1,5-pregnadiene-3β,17α-diol-20-one 17-acetate with benzoyl chloride in pyridine to obtain 9α,11β-dichloro-1,5-pregnadiene-3β,17α-diol-20 - one 3 benzoate 17-acetate.

In the above procedures (A) and (B) by substituting 9α,11β-dichloro-1,5-pregnadiene-3α,17α-diol-20-one 17-acetate for 9α,11β-dichloro-1,5-pregnadiene-3β,17α-diol-20-one 17-acetate, there may be obtained the respective 3α-esters, i.e., 9α,11β-dichloro-1,5-pregnadiene-3α,17α-diol-20-one diacetate, 9α,11β-dichloro-1,5-pregnadiene-3α,17α-diol-20-one 3-propionate 17-acetate, and 9α,11β-dichloro-1,5-pregnadiene-3α,17α-diol-20-one 3 - benzoate 17 - acetate.

EXAMPLE 32

*1,5-pregnadiene-3β,17α-diol-20-one-3-acetate 17-caproate*

(A) *1,5-pregnadiene-3β,17α-diol-20-one 3-acetate.*—In a manner similar to that described in Example 3(A), react 1,5-pregnadiene-3β,17α-diol-20-one with acetic anhydride in pyridine at 25° C. to obtain 1,5-pregnadiene-3β,17α-diol-20-one 3-acetate.

Similarly, reaction of 1,5-pregnadiene-3α,17α-diol-20-one with acetic anhydride in pyridine as described above yields 1,5-pregnadiene-3α,17α-diol-20-one 3-acetate.

(B) *1,5-pregnadiene-3β,17α-diol-20-one 3-acetate 17-caproate.*—To a solution of 1 g. of 1,5-pregnadiene-3β,17α-diol-20-one 3-acetate in 10 ml. of N-caproic acid through which argon gas is bubbled, add under anhydrous conditions 2 ml. of trifluoroacetic anhydride. Gently bubble the argon gas through the reaction mixture at a temperature of 85–90° C. for 55 minutes. Pour the reaction mixture into ice water and extract with methylene chloride. Extract the combined methylene chloride extracts with 3% sodium hydroxide and finally with water. Evaporate the organic layer to a residue and dissolve the residue in hexane and chromatograph on Florisil, eluting with ether containing increasing amounts of hexane. Combine the like fractions and evaporate to a residue comprising 1,5-pregnadiene-3β,17α-diol-20-one 3-acetate 17-caproate. Purify by crystallization from ether-hexane.

Similarly, by substituting 1,5-pregnadiene-3α,17α-diol-20-one 3-acetate for 1,5-pregnadiene-3β,17α-diol-20-one 3-acetate in the above procedure, there is obtained 1,5-pregnadiene-3α,17α-diol-20-one 3-acetate 17-caproate.

We claim:

1. A compound selected from the group consisting of 3-hydroxy-1,5-bis-dehydro-steroids of the folowing structural formula:

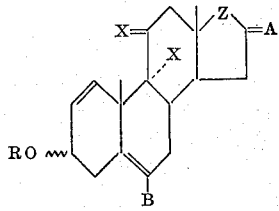

wherein A is a member selected from the group consisting of hydrogen, (H,α-lower alkyl), (H,β-lower alkyl) lower alkylene, (H,α-hydroxy), and (H,α-lower alkanoyloxy); B is a member selected from the group consisting of hydrogen, lower alkyl, and halogen; R is a member selected from the group consisting of hydrogen lower alkyl and acyl; Y is a member selected from the group consisting of hydrogen, keto, (H,βOR₁), (H,αOR₁), and (H,β-halogen), R₁ being a member selected from the group consisting of hydrogen and lower alkanoyl; X is a member selected from the group consitsing of hydrogen and halogen, and X is hydrogen when Y is a member selected from the group consisting of hydrogen and (H,αOH), and X is halogen when Y is (H,β-halogen), and X and Y together are members of the group consisting of an epoxy and a double bond; and Z is a member selected from the group consisting of

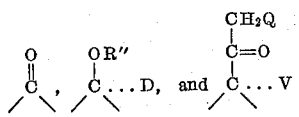

R″ being a member selected from the group consisting of hydrogen and an acid radical of a carboxylic acid having up to 18 carbon atoms; D being a member selected from the group consisting of hydrogen, lower alkyl, ethinyl, halogeno-ethinyl, and alkyl-ethinyl; V being a member selected from the group consisting of hydrogen, hydroxy, and lower alkanoyloxy; and Q is a member selected from the group consisting of hydrogen, hydroxy, acyloxy, and halogen.

2. 17α-lower alkyl-1,5,-androstadiene-3,17β-diol.
3. 17α-methyl-1,5-androstadiene-3β,17β-diol.
4. 17α-methyl-1,5-androstadiene-3α,17β-diol.
5. 3-OR-17α-methyl-1,5-androstadiene-17β-ol; wherein R is an acid radical of a carboxylic acid having up to 18 carbon atoms.
6. 17α-methyl-1,5-androstadiene - 3β,17β-diol 3 - decanoate.
7. 1,5-pregnadiene-3β,11β,17α,21-tetrol-20-one.
8. 1,5-pregnadiene-3α,11β,17α,21-tetrol-20-one.
9. In the process of preparing a 3-hydroxy-Δ¹,⁵-steroid of the following formula:

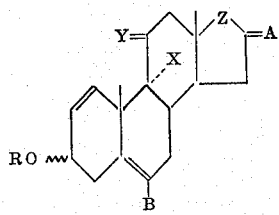

wherein A is a member selected from the group consisting of hydrogen, (H,α-lower alkyl), (H,β-lower alkyl), lower alkylene, (H,α-hydroxy), and (H,α-lower alkanoyloxy); B is a member selected from the group consisting of hydrogen, lower alkyl and halogen; R is a member selected from the group consisting of hydrogen, lower alkyl and acyl; Y is a member selected from the group consisting of hydrogen, keto, (H,βOR¹), (H,αOR¹), and (H,β-halogen), R¹ being a member selected from the group consisting of hydrogen and lower alkanoyl; X is a member selected from the group consisting of hydrogen and halogen, and X is hydrogen when Y is a member selected from the group consisting of hydrogen and (H,αOH), and X is halogen when Y is (H,β-halogen) and X and Y together are members of the group consisting of an epoxy and a double bond; and Z is a member selected from the group consisting of

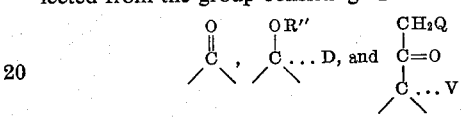

R″ being a member selected from the group consisting of hydrogen and an acid radical of a carboxylic acid having up to 18 carbon atoms; D being a member selected from the group consisting of hydrogen, lower alkyl, ethinyl, halogeno-ethinyl, and alkyl-ethinyl; V being a member selected from the group consisting of hydrogen, hydroxy, and lower alkanoyloxy; and Q is a member selected from the group consisting of hydrogen, hydroxy, acyloxy, and halogen; the step which comprises reacting a 3-keto-Δ¹,⁵-steroid of the following formula:

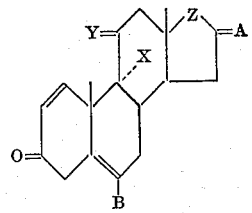

wherein A, B, X, Y and Z are as defined hereinabove and wherein all reactive ketones other than at C-3 are protected by ketone derivatives, with a reducing reagent selected from the group consisting of an alkali metal aluminum hydrde, an alkali metal borohydride, and a metal alkoxide in the corresponding alkanol.

10. The process for preparing 17α-methyl-1,5-androstadiene-3β,17β-diol which comprises reacting 17α-methyl-1,5-androstadiene-17β-ol-3-one with a reagent of the group consisting of an alkali metal aluminum hydride, an alkali metal borohydride, and a metal alkoxide in the corresponding alkanol.

11. The process for preparing 17α-methyl-1,5-androstadiene-3β,17β-diol which comprises reacting 17α-methyl-1,5-androstadiene-17β-ol-3-one with sodium borohydride.

References Cited

UNITED STATES PATENTS 3,127,428  3/1964  Tanabe et al. _____ 260—397.4
3,127,430  3/1964  Shapiro et al. _____ 260—397.4

OTHER REFERENCES

Loewenthal, Tetrahedron, vol. 6, No. 4, pp. 269–303, June 1959, pp. 281–283.

LEWIS GOTTS, *Primary Examiner.*

H. A. FRENCH, *Assistant Examiner.*

UNITED STATES PATENT OFFICE
CERTIFICATE OF CORRECTION

Patent No. 3,332,967         July 25, 1967

Eugene P. Oliveto et al.

It is hereby certified that error appears in the above numbered patent requiring correction and that the said Letters Patent should read as corrected below.

Column 3, line 74, for "3β,11β,7α" read -- 3β,11β,17α --; column 13, line 44, for "5-androstadiene" read -- 1,5-androstadiene --; column 15, line 66, for "15β-methyl" read -- 16β-methyl --; column 18, line 8, for "16β-ethyl" read -- 16β-methyl --; line 46, for "16β-ethyl" read -- 16β-methyl --; column 22, lines 26 and 27, for "17-methylenedioxy", each occurrence, read -- 17-ethylenedioxy --; column 27, line 72, for "3β,17α,21-one" read -- 3β,17α,21-triol-20-one --; column 32, line 3, for "3β,11β,17α" read -- 3α,11β,17α --; column 33, lines 6 to 15 the formula should appear as shown below instead of as in the patent:

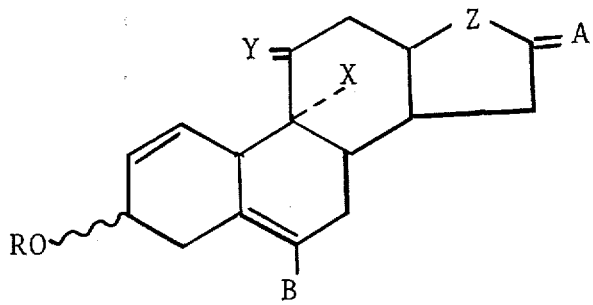

Signed and sealed this 9th day of July 1968.

(SEAL)
Attest:

EDWARD M. FLETCHER, JR.                    EDWARD J. BRENNER
Attesting Officer                          Commissioner of Patents